United States Patent
Yamasaki et al.

(10) Patent No.: US 9,622,117 B2
(45) Date of Patent: Apr. 11, 2017

(54) WIRELESS COMMUNICATION APPARATUS PROVIDED WITH CONTROL OF SWITCHING OVER BETWEEN TWO COMMUNICATION SYSTEMS

(71) Applicant: Panasonic Intellectual Property Management Co., Ltd., Osaka (JP)

(72) Inventors: Akira Yamasaki, Osaka (JP); Nobuhiko Arashin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 14/585,766

(22) Filed: Dec. 30, 2014

(65) Prior Publication Data

US 2015/0110074 A1    Apr. 23, 2015

Related U.S. Application Data

(63) Continuation of application No. PCT/JP2013/001543, filed on Mar. 8, 2013.

(30) Foreign Application Priority Data

Jul. 2, 2012  (JP) .................. 2012-148251

(51) Int. Cl.
*H04W 36/00*  (2009.01)
*H04W 36/14*  (2009.01)
(Continued)

(52) U.S. Cl.
CPC ......... *H04W 36/0011* (2013.01); *H04L 69/18* (2013.01); *H04W 36/14* (2013.01); *H04W 84/12* (2013.01)

(58) Field of Classification Search
CPC . H04W 36/0011; H04W 36/14; H04W 84/12; H04L 69/18
See application file for complete search history.

(56) References Cited

U.S. PATENT DOCUMENTS 6,680,929 B1   1/2004  Iida et al.
2006/0153105 A1   7/2006  Jia et al.
(Continued)

FOREIGN PATENT DOCUMENTS

JP   2000-261399   9/2000
JP   2007-165999   6/2007
(Continued)

OTHER PUBLICATIONS

International Search Report issued May 21, 2013 in corresponding International Application No. PCT/JP2013/001543.
(Continued)

*Primary Examiner* — Pao Sinkantarakorn
*Assistant Examiner* — Kabir Jahangir
(74) *Attorney, Agent, or Firm* — Wenderoth, Lind & Ponack, L.L.P.

(57) ABSTRACT

A wireless communication apparatus uses a Wi-Fi system to transmit to another wireless communication apparatus a WiGig switching request frame (F1) requesting that the communication method for communicating with another wireless communication apparatus be switched from the Wi-Fi system to a WiGig system. The wireless communication apparatus uses RSSI when the WiGig switching request frame (F1) was received to determine whether to allow the switch from the Wi-Fi system to the WiGig system, and uses the Wi-Fi system to transmit to the wireless communication apparatus a WiGig switching response frame (F2) indicating the result of the determination.

13 Claims, 23 Drawing Sheets

(51) Int. Cl.
*H04L 29/06* (2006.01)
*H04W 84/12* (2009.01)

(56) References Cited

U.S. PATENT DOCUMENTS

| | | |
|---|---|---|
| 2007/0133491 A1 | 6/2007 | Ushiki et al. |
| 2009/0011770 A1 | 1/2009 | Jung et al. |
| 2011/0183614 A1 | 7/2011 | Tamura |
| 2012/0099448 A1 | 4/2012 | Matsuo et al. |
| 2012/0311176 A1* | 12/2012 | Dellinger .......... H04M 15/8055 709/232 |
| 2013/0095761 A1* | 4/2013 | Chu ...................... H04W 36/30 455/41.2 |
| 2013/0266136 A1* | 10/2013 | Chu ...................... H04K 1/003 380/34 |

FOREIGN PATENT DOCUMENTS

| | | |
|---|---|---|
| JP | 2010-161654 | 7/2010 |
| JP | 2011-151746 | 8/2011 |
| JP | 2011-188395 | 9/2011 |
| JP | 2012-90226 | 5/2012 |

OTHER PUBLICATIONS

International Preliminary Report on Patentability and Written Opinion of the International Searching Authority issued Jan. 15, 2015 in International (PCT) Application No. PCT/JP2013/001543.

* cited by examiner

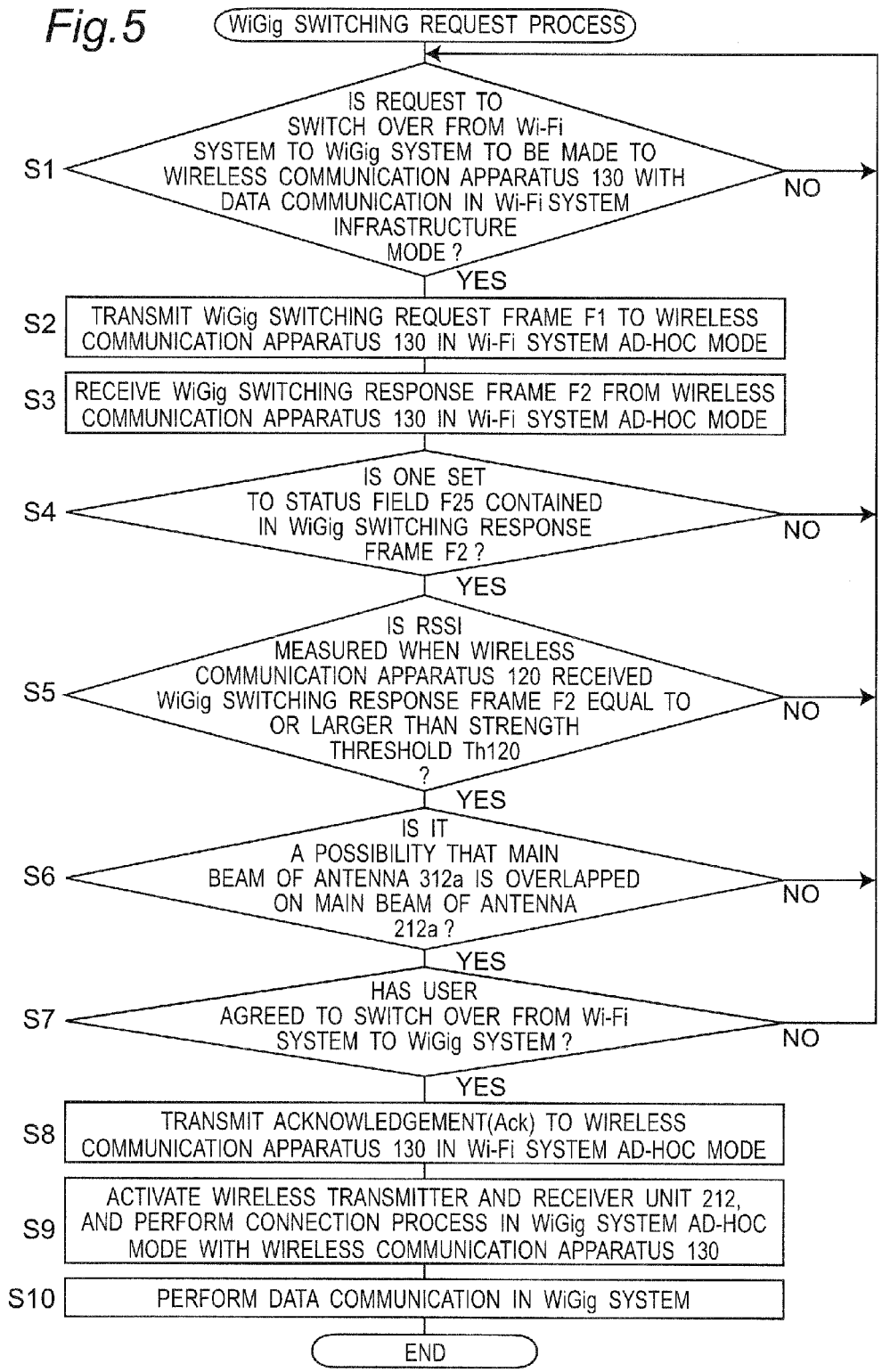

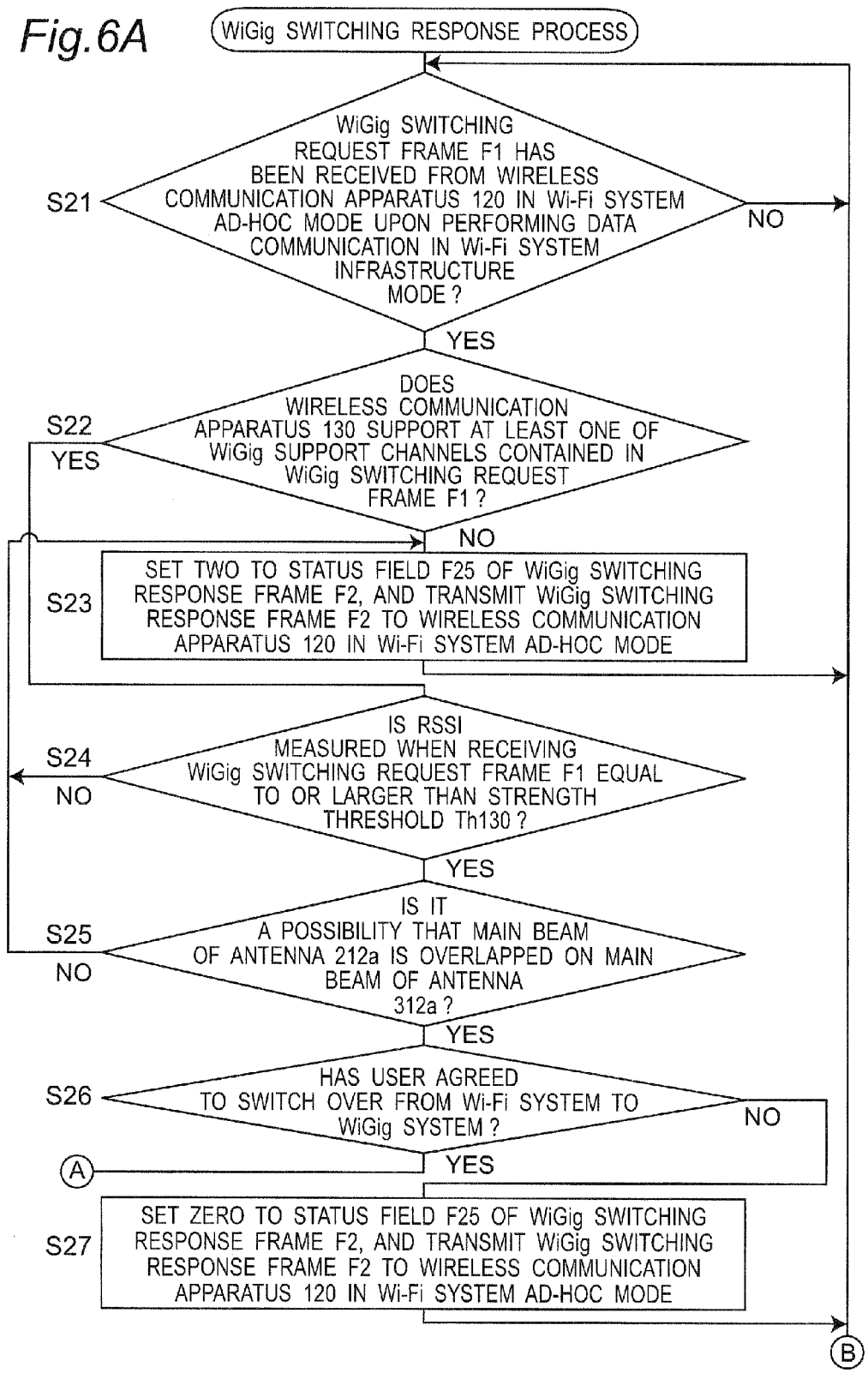

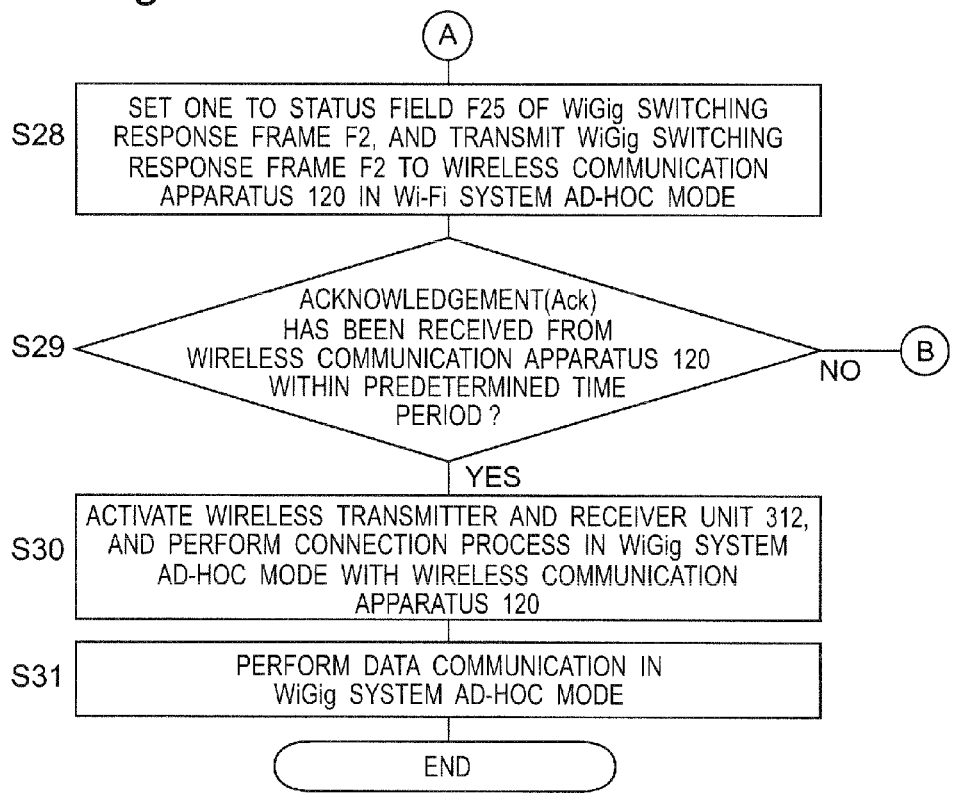

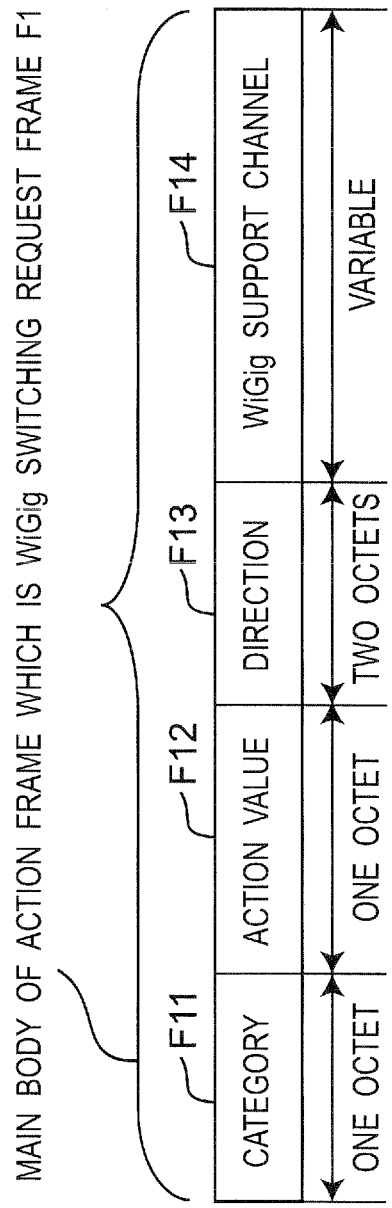

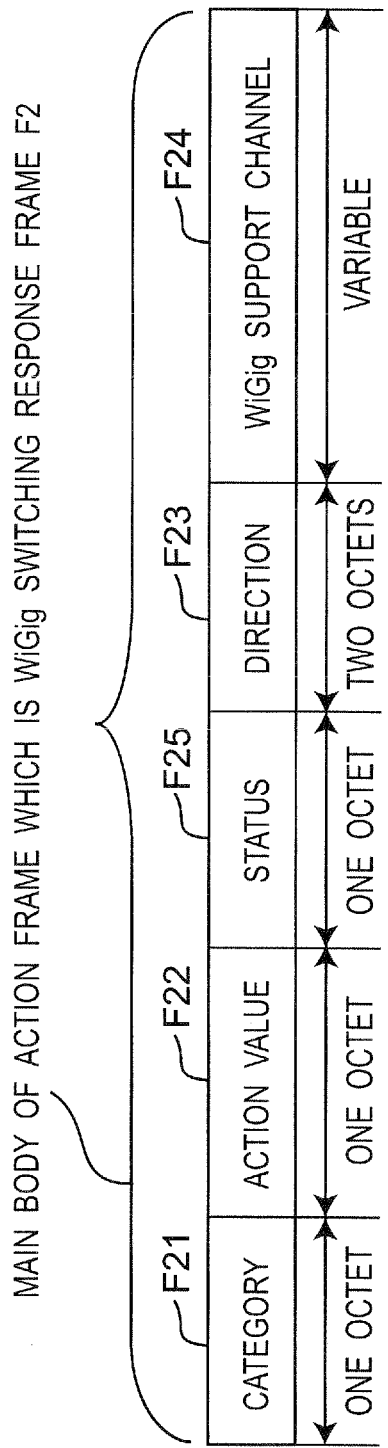

Fig.12

| VALUE (CODE) TO BE SET TO CATEGORY FIELDS F11 AND F21 | MEANING |
|---|---|
| 0 | SPECTRUM MANAGEMENT |
| 1 | QoS |
| 2 | DLS |
| 3 | BLOCK ACKNOWLEDGEMENT (Block Ack) |
| 4-126 | RESERVED |
| 127 | VENDOR-SPECIFIC |
| 128-255 | ERROR |

Fig.13

| VALUE TO BE SET TO ACTION VALUE FIELDS F12 AND F22 WHEN ZERO IS SET TO CATEGORY FIELDS F11 AND F21 | MEANING |
|---|---|
| 0 | MANAGEMENT REQUEST |
| 1 | MANAGEMENT REPORT |
| 2 | TPC REQUEST |
| 3 | TPC REPORT |
| 4 | CHANNEL SWITCH ANNOUNCEMENT |
| 5 | WiGig SWITCHING REQUEST |
| 6 | WiGig SWITCHING RESPONSE |
| 7-255 | RESERVED |

Fig. 14

| VALUE TO BE SET TO DIRECTION FIELDS F13 AND F23 | MEANING |
|---|---|
| 0-359 | DIRECTION OF TRANSMITTER (0: NORTH, 90: EAST, 180: SOUTH, 270: WEST) |
| 360-65535 | ERROR |

Fig. 15

| VALUE TO BE SET TO WiGig SUPPORT CHANNEL FIELDS F14 AND F24 | MEANING |
|---|---|
| 01-04 | WiGig CHANNEL SUPPORTED BY TRANSMITTER (E.G., "020304" MEANS THAT 2CH, 3CH, AND 4CH ARE AVAILABLE IN WiGig SYSTEM COMMUNICATION) |

Fig. 16

| VALUE TO BE SET TO STATUS FIELD F25 | MEANING |
|---|---|
| 0 | DENY |
| 1 | ACCEPT |
| 2 | OUT OF SERVICE |
| 3-255 | ERROR |

Fig.17

| FIELD | INFORMATION | NOTES |
|---|---|---|
| F11 | CATEGORY | 0 |
| F12 | ACTION VALUE | 5 |
| F13 | DIRECTION | DIRECTION OF TRANSMITTER TERMINAL APPARATUS (FROM 0 TO 359) |
| F14 | WiGig SUPPORT CHANNEL | WiGig SUPPORT CHANNEL LIST (FROM 01 TO 04) |

MAIN BODY OF WiGig SWITCHING REQUEST FRAME F1

Fig.18

| FIELD | INFORMATION | NOTES |
|---|---|---|
| F21 | CATEGORY | 0 |
| F22 | ACTION VALUE | 6 |
| F25 | STATUS | (0: DENY, 1: ACCEPT, 2: OUT OF SERVICE) |
| F23 | DIRECTION | DIRECTION OF TRANSMITTER TERMINAL APPARATUS (FROM 0 TO 359) |
| F24 | WiGig SUPPORT CHANNEL | WiGig SUPPORT CHANNEL LIST (FROM 01 TO 04) |

MAIN BODY OF WiGig SWITCHING RESPONSE FRAME F2

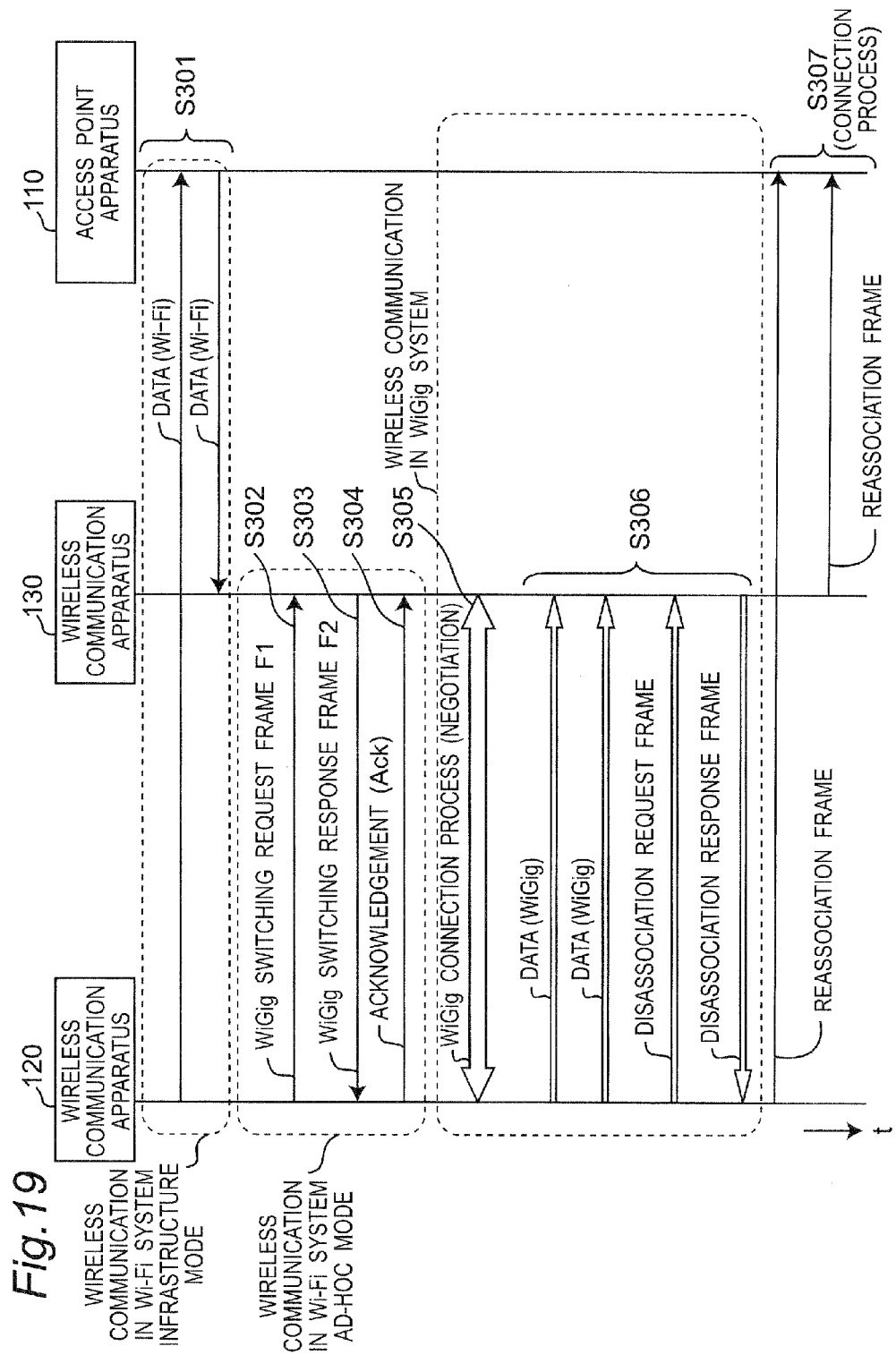

Fig.20

| FIELD | INFORMATION | VALUE |
|---|---|---|
| F11 | CATEGORY | 0 |
| F12 | ACTION VALUE | 5 |
| F13 | DIRECTION | 0 |
| F14 | WiGig SUPPORT CHANNEL | 020304 |

MAIN BODY OF WiGig SWITCHING REQUEST FRAME F1

REPRESENTING THAT ANTENNA 212a POINTS 0 DEGREES (DUE NORTH) FROM NORTH

REPRESENTING THAT WIRELESS COMMUNICATION APPARATUS 120 SUPPORTS 2 CHANNEL, 3 CHANNEL, AND 4 CHANNEL

Fig.21

| FIELD | INFORMATION | VALUE |
|---|---|---|
| F21 | CATEGORY | 0 |
| F22 | ACTION VALUE | 6 |
| F25 | STATUS | 1 |
| F23 | DIRECTION | 180 |
| F24 | WiGig SUPPORT CHANNEL | 020304 |

MAIN BODY OF WiGig SWITCHING RESPONSE FRAME F2

REPRESENTING THAT COMMUNICATION SYSTEM CAN BE SWITCHED OVER TO WiGig SYSTEM

REPRESENTING THAT ANTENNA 312a POINTS 180 DEGREES (DUE SOUTH) FROM NORTH

REPRESENTING THAT WIRELESS COMMUNICATION APPARATUS 130 SUPPORTS 2 CHANNEL, 3 CHANNEL, AND 4 CHANNEL

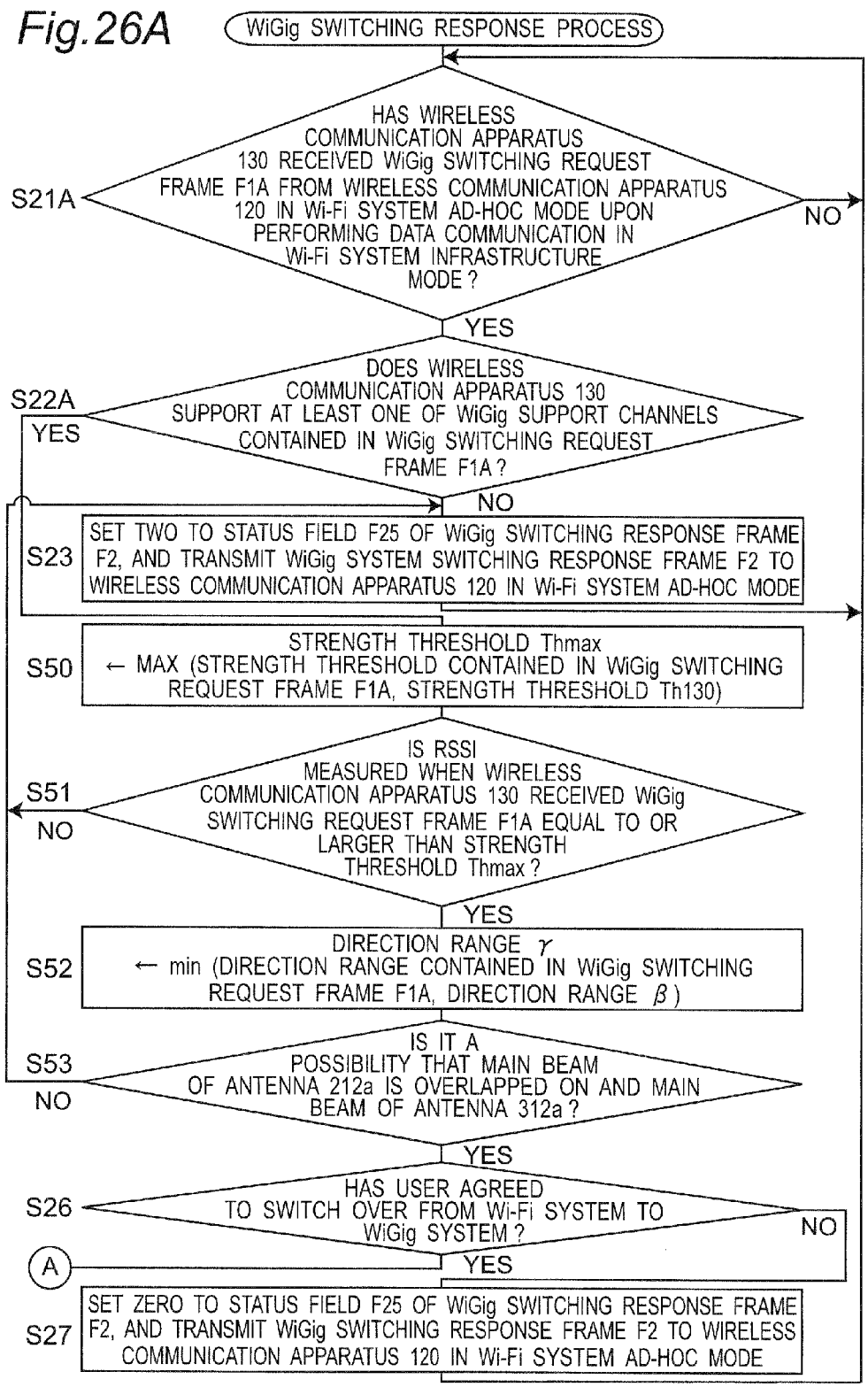

Fig.28

| STRENGTH THRESHOLD TO BE SET TO STRENGTH THRESHOLD FIELD F15 | MEANING |
|---|---|
| −128–127 | THRESHOLD [dBm] TO BE COMPARED WITH RSSI [dBm] OF WIRELESS SIGNAL RECEIVED IN AD-HOC MODE |

Fig.29

| DIRECTION RANGE TO BE SET TO DIRECTION RANGE FIELD F16 | MEANING |
|---|---|
| 000–359 | DIRECTION RANGE FROM DIRECTION OF MAIN BEAM |

Fig. 30

| FIELD | INFORMATION | NOTES |
|---|---|---|
| F11 | CATEGORY | 0 |
| F12 | ACTION VALUE | 5 |
| F13 | DIRECTION | DIRECTION OF TRANSMITTER TERMINAL APPARATUS (FROM 0 TO 359) |
| F15 | STRENGTH THRESHOLD | STRENGTH THRESHOLD [dBm] FOR JUDGING WHETHER OR NOT TO SWITCH OVER TO WiGig SYSTEM |
| F16 | DIRECTION RANGE | DIRECTION RANGE FROM DIRECTION OF MAIN BEAM (FROM 0 TO 359) |
| F14 | WiGig SUPPORT CHANNEL | WiGig SUPPORT CHANNEL LIST (FROM 01 TO 04) |

MAIN BODY OF WiGig SWITCHING REQUEST FRAME F1A

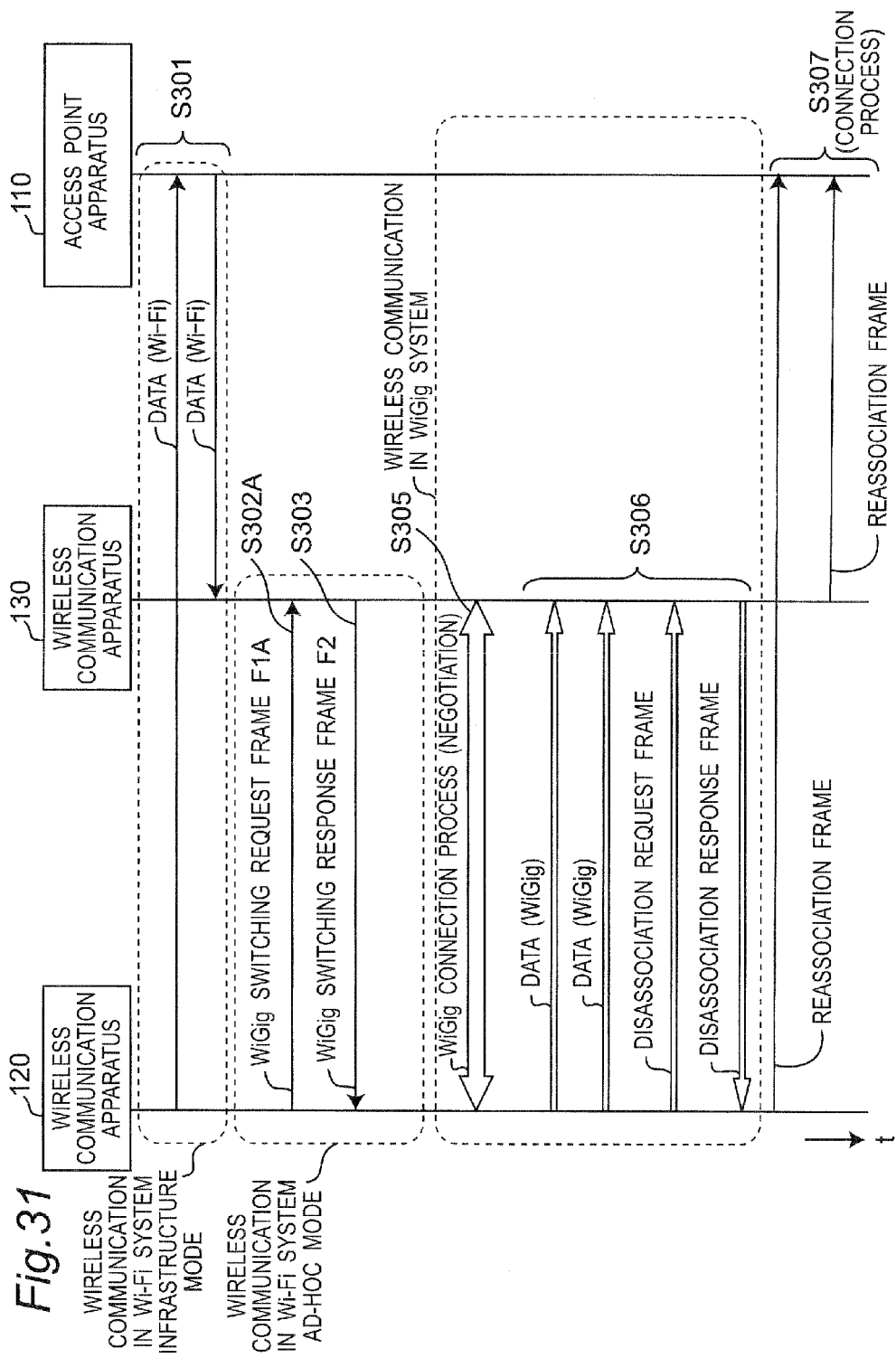

Fig.32

| FIELD | INFORMATION | VALUE |
|---|---|---|
| F11 | CATEGORY | 0 |
| F12 | ACTION VALUE | 5 |
| F13 | DIRECTION | 0 |
| F15 | STRENGTH THRESHOLD | -50 |
| F16 | DIRECTION RANGE | 30 |
| F14 | WiGig SUPPORT CHANNEL | 020304 |

MAIN BODY OF WiGig SWITCHING REQUEST FRAME F1A

REPRESENTING THAT STRENGTH THRESHOLD Th120 STORED IN TRANSMISSION SYSTEM JUDGMENT INFORMATION STORAGE UNIT 260 IS -50 dBm

REPRESENTING THAT DIRECTION RANGE α STORED IN TRANSMISSION SYSTEM JUDGMENT INFORMATION STORAGE UNIT 260 IS ±30 DEGREES FROM DIRECTION OF MAIN BEAM

WIRELESS COMMUNICATION APPARATUS PROVIDED WITH CONTROL OF SWITCHING OVER BETWEEN TWO COMMUNICATION SYSTEMS

CROSS-REFERENCE TO RELATED APPLICATIONS

This is a continuation application based on PCT application No. PCT/JP2013/001543 as filed on Mar. 8, 2013, which claims priority to Japanese patent application No. JP 2012-148251 as filed Jul. 2, 2012, the contents of which are incorporated herein by reference.

BACKGROUND OF THE DISCLOSURE

1. Field of the Disclosure

The present disclosure relates to a wireless communication apparatus, a wireless communication system including the wireless communication apparatus, and a control method for the wireless communication system. In particular, the present disclosure relates to a wireless communication apparatus which switches a transmission system between two transmission systems, a wireless communication system including the wireless communication apparatus, and a control method for the wireless communication system.

2. Description of the Related Art

In recent years, wireless Local Area Network (LAN) standards such as IEEE 802.11a which uses the 5 GHz microwave band and IEEE 802.11g which uses the 2.4 GHz microwave band have been established. Network configurations in conformity with the wireless LAN standards include an infrastructure mode and an ad-hoc mode. In this case, the network in the infrastructure mode includes an access point apparatus such as a base station, and a plurality of wireless communication apparatuses connected to the access point apparatus. The access point apparatus arbitrates access timings of the wireless communication apparatuses. In addition, the network in the ad-hoc mode does not need the above-described access point apparatus, and the wireless communication apparatuses determine access timings thereof. On the other hand, the Wireless Gigabit Alliance (WGA) has established the Wireless Gigabit (WiGig) which is a wireless communication standard for achieving ultra-high speed communication exceeding 1 Gbps with the 60 GHz millimeter-wave band. The WiGig system will be established as IEEE 802.1 lad which is a next generation wireless LAN standard in future.

Therefore, it is expected that electronic appliances having a wireless communication function in conformity with a conventional wireless LAN standard and a wireless communication function in conformity with a WiGig standard will come into use in future. As a result, a technology of selecting optimum wireless communication means will be required in the wireless communication apparatus which has a plurality of wireless communication means. For example, a wireless communication apparatus of Patent Document 1 includes: a wireless communication unit which has a plurality of wireless communication means; a communication means selecting unit for selecting any one of the plurality of wireless communication means; a user operation unit for a user to input information about a location to use the wireless communication apparatus; and a communication control unit configured to control the communication means selecting unit to select one of the plurality of wireless communication means according to any one of a plurality of types of priorities. In this case, the communication control unit switches over the priority based on the information about a location to use the wireless communication apparatus input from the user operation unit and controls the communication means selecting unit according to the priority after the switch-over process.

The prior art documents related to the present disclosure are as follows:

Patent Document 1: Japanese Patent Laid-open Publication No. JP2011-188395A;
Patent Document 2: Japanese Patent Laid-open Publication No. JP2007-165999A;
Patent Document 3: Japanese Patent Laid-open Publication No. JP2000-261399A;
Patent Document 4: Japanese Patent Laid-open Publication No. JP2010-161654A;
Patent Document 5: U.S. Patent Application Publication No. US2007/0133491A;
Patent Document 6: U.S. Patent Application Publication No. US2006/0153105A; and
Patent Document 7: U.S. Patent Application Publication No. US2009/0011770A.

In general, in the case where a wireless communication apparatus which has a plurality of wireless communication means switches over the plurality of wireless communication means, the wireless communication apparatus has to make two wireless communication means operate during the switch-over process to prevent occurrence of a period during which the wireless communication apparatus cannot perform communication. However, the wireless communication apparatus consumes larger electric power upon making the plurality of wireless communication means operate. Such an increase in the power consumption is a big problem for a battery-powered mobile wireless communication terminal.

SUMMARY OF THE DISCLOSURE

The present disclosure provides a wireless communication apparatus which can solve the above described problem and reduce the power consumption as compared with the prior art, a wireless communication system including the wireless communication apparatus, and a control method for the wireless communication system.

According to the present disclosure, there is provided a first wireless communication apparatus for use in a wireless communication system, and the wireless communication system includes the first wireless communication apparatus and a second wireless communication apparatus. The first wireless communication apparatus includes first and second transmitter and receiver unit, and a first transmission system judging unit. The first wireless transmitter and receiver unit performs wireless communication by a predetermined first transmission system, and the second wireless transmitter and receiver unit performs wireless communication by a predetermined second transmission system. The first transmission system judging unit controls the first wireless transmitter and receiver unit and the second wireless transmitter and receiver unit.

The first transmission system judging unit controls the first wireless transmitter and receiver unit to directly transmit a switching request frame to the second wireless communication apparatus by specifying an address that identifies the second wireless communication apparatus, where the switching request frame indicates a request to switch over the transmission system for performing wireless communication between the first wireless communication apparatus and the second wireless communication apparatus from the first transmission system to the second transmission system.

In response to reception of a switching response frame by the first wireless transmitter and receiver unit, the first transmission system judging unit judges whether or not to activate the second wireless transmitter and receiver unit and to switch over the transmission system from the first transmission system to the second transmission system based at least on a received signal strength measured when the first wireless transmitter and receiver unit received the switching response frame. The switching response frame is transmitted by the second wireless communication apparatus in response to the switching request frame and indicating acceptance of switching over the transmission system from the first transmission system to the second transmission system.

In the wireless communication apparatus according to the present disclosure, the first wireless communication apparatus can judge whether or not to switch over a transmission system for performing wireless communication between the first wireless communication apparatus and a second wireless communication apparatus from the first transmission system to the second transmission system without requiring the second wireless communication apparatus to activate a second wireless transmitter and receiver unit and a fourth wireless transmitter and receiver unit for performing wireless communication when the first wireless communication apparatus and the second wireless communication apparatus wirelessly communicate in the first transmission system. Consequently, the wireless communication apparatus can reduce the power consumption as compared with the prior art.

BRIEF DESCRIPTION OF THE DRAWINGS

FIG. 5 is a flow chart showing a WiGig switching request process performed by a transmission system judging unit 270 of FIG. 3 when the wireless communication apparatus 120 requests the wireless communication apparatus 130 to switch over a transmission system for performing wireless communication between the wireless communication apparatus 120 and the wireless communication apparatus 130 to a WiGig system in the wireless communication system 100 of FIG. 1;

FIG. 6A is a flow chart showing a first part of a WiGig switching response process performed by a transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to the WiGig system in the wireless communication system 100 of FIG. 1;

FIG. 6B is a flow chart showing a second part of the WiGig switching response process performed by the transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to the WiGig system in the wireless communication system 100 of FIG. 1;

FIG. 10 is a format diagram showing a format of a WiGig Switching Request Frame F1 transmitted in step S2 of FIG. 5;

FIG. 11 is a format diagram showing a format of a WiGig Switching Response Frame F2 transmitted in step S28 of FIG. 6B;

FIG. 12 is a table showing values (codes) to be set to Category fields F11 and F21 of FIG. 10 and FIG. 11;

FIG. 13 is a table showing values to be set to Action Value fields F12 and F22 of FIG. 10 and FIG. 11 when zero is set to the Category fields F11 and F21 of FIG. 10 and FIG. 11;

FIG. 14 is a table showing values to be set to Direction fields F13 and F23 of FIG. 10 and FIG. 11;

FIG. 15 is a table showing values to be set to WiGig Support Channel fields F14 and F24 of FIG. 10 and FIG. 11;

FIG. 16 is a table showing values to be set to a Status field F25 of FIG. 11;

FIG. 17 is a table showing values to be set to the respective fields F11, F12, F13, and F14 of the WiGig Switching Request Frame F1 transmitted in step S2 of FIG. 5;

FIG. 18 is a table showing values to be set to the respective fields F21, F22, F23, F24, and F25 of the WiGig Switching Response Frame F2 transmitted in step S28 of FIG. 6B;

FIG. 19 is a timing chart showing an operation of the wireless communication system 100 of FIG. 1 when the wireless communication system 100 switches over the transmission system for performing wireless communication between the wireless communication apparatus 120 and the wireless communication apparatus 130 from an infrastructure mode of a Wi-Fi system to a WiGig system;

FIG. 20 is a table showing values to be set to the respective fields F11, F12, F13, and F14 of the WiGig Switching Request Frame F1 transmitted in step S302 of FIG. 19;

FIG. 21 is a table showing values to be set to the respective fields F21, F22, F23, F24, and F25 of the WiGig Switching Response Frame F2 transmitted in step S303 of FIG. 19;

FIG. 26A is a flow chart showing a first part of a WiGig switching response process according to the second embodiment of the present disclosure performed by the transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to a WiGig system in the wireless communication system 100 of FIG. 1;

FIG. 28 is a table showing a strength threshold to be set to a Strength Threshold field F15 of FIG. 27;

FIG. 29 is a table showing a direction range to be set to a Direction Range field F16 of FIG. 27;

FIG. 30 is a table showing values to be set to the respective fields F11, F12, F13, F14, F15, and F16 of the WiGig Switching Request Frame F1A transmitted in step S2A of FIG. 25;

FIG. 31 is a timing chart showing an operation of the wireless communication system 100 when the wireless communication system 100 switches over the transmission system for performing wireless communication between the wireless communication apparatus 120 and the wireless communication apparatus 130 from a Wi-Fi system to a WiGig system in the second embodiment of the present disclosure; and FIG. 32 is a table showing values to be set to the respective fields F11, F12, F13, F14, F15, and F16 of the WiGig Switching Request Frame. F1A transmitted in step S302A of FIG. 31.

DETAILED DESCRIPTION OF THE EMBODIMENTS

Embodiments will be described in detail below with reference to the drawings as required. However, excessively detailed descriptions may be omitted. For example, detailed descriptions of already well-known matters and overlapping descriptions of substantially similar configuration may be omitted. This is to avoid the following description from unnecessarily becoming redundant and to easily understand the same description by those skilled in the art.

It is noted that that the inventors provide the accompanying drawings and the following description to make those skilled in the art thoroughly understand the present disclosure, and thus, the subject matter recited in the claims is not intended to be limited thereby.

First Embodiment

Figure 1:
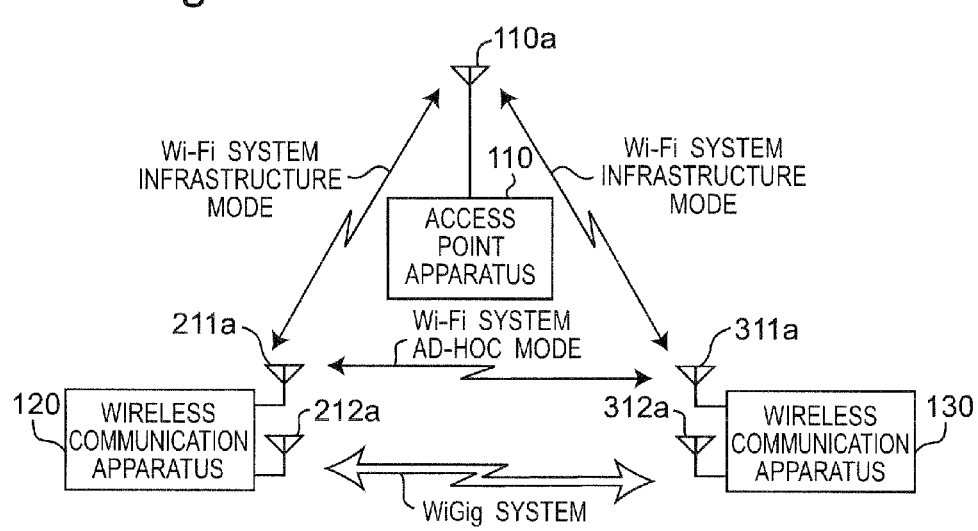
FIG. 1 is a block diagram illustrating a configuration of a wireless communication system 100 according to a first embodiment of the present disclosure.
Figure 2:
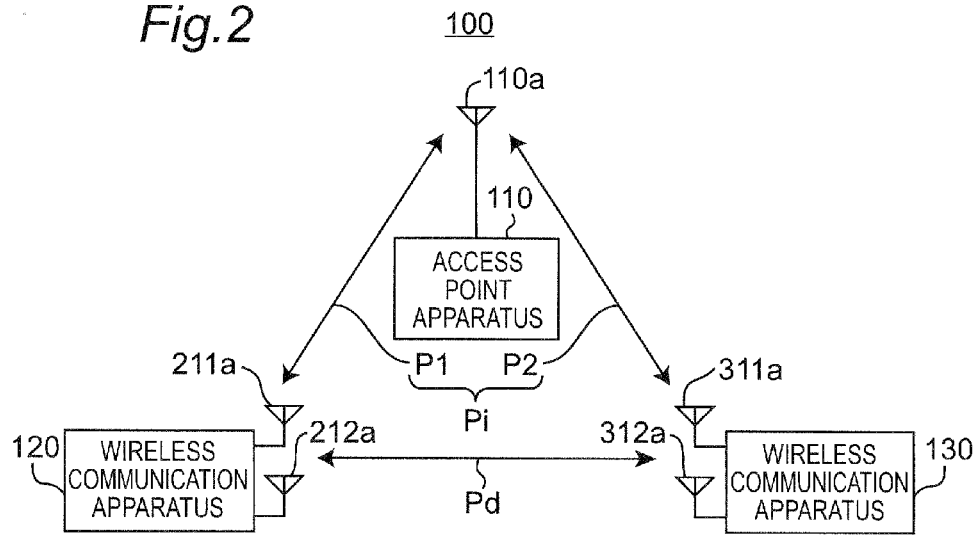
FIG. 2 is a block diagram illustrating a communication path Pi and a communication path Pd in the wireless communication system 100 of FIG. 1.
Figure 3:
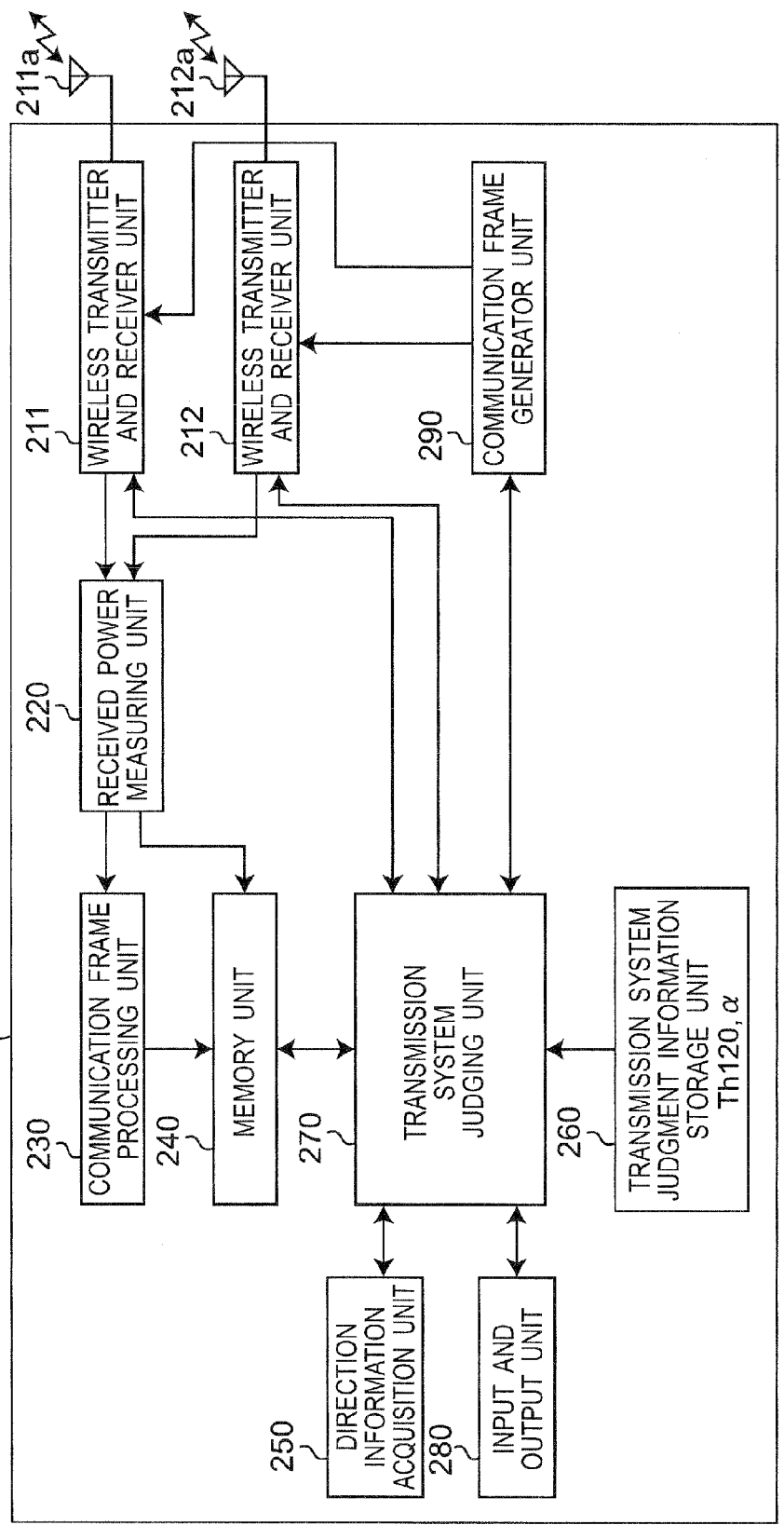
FIG. 3 is a block diagram illustrating a configuration of a wireless communication apparatus 120 of FIG. 1.
Figure 4:
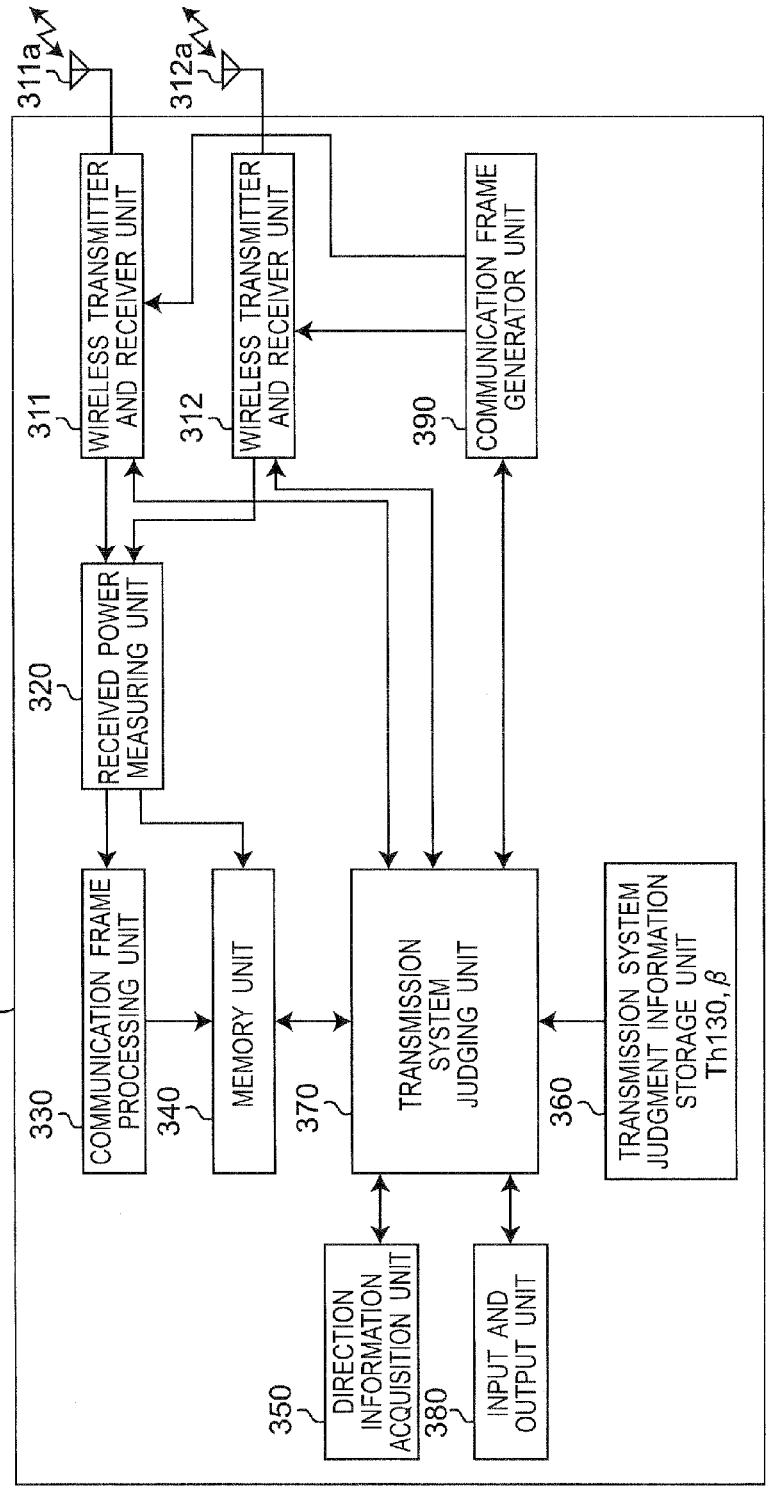
FIG. 4 is a block diagram illustrating a configuration of a wireless communication apparatus 130 of FIG. 1.

FIG. 1 is a block diagram illustrating a configuration of a wireless communication system 100 according to a first embodiment of the present disclosure, and FIG. 2 is a block diagram illustrating a communication path Pi and a communication path Pd in the wireless communication system 100 of FIG. 1. In addition, FIG. 3 is a block diagram illustrating a configuration of a wireless communication apparatus 120 of FIG. 1, and FIG. 4 is a block diagram illustrating a configuration of a wireless communication apparatus 130 of FIG. 1. Further, FIG. 5 is a flow chart showing a WiGig switching request process performed by a transmission system judging unit 270 of FIG. 3 when the wireless communication apparatus 120 requests the wireless communication apparatus 130 to switch over a transmission system for performing wireless communication between the wireless communication apparatus 120 and the wireless communication apparatus 130 to a WiGig system in the wireless communication system 100 of FIG. 1. Furthermore, FIG. 6A and FIG. 6B are flow charts respectively showing a first part and a second part of a WiGig switching response process performed by a transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to the WiGig system in the wireless communication system 100 of FIG. 1, respectively.

Referring to FIG. 1, the wireless communication system 100 according to the first embodiment includes the wireless communication apparatus 120, the wireless communication apparatus 130, and an access point apparatus 110 configured to relay a wireless signal transmitted and received between the wireless communication apparatuses 120 and 130. As described in detail later, the wireless communication apparatuses 120 and 130 perform wireless communication in a Wireless Fidelity (Wi-Fi) system or a WiGig system. The wireless communication apparatus 120 includes an antenna 211a to be used in Wi-Fi wireless communication and an antenna 212a to be used in WiGig wireless communication and supports two transmission systems of the Wi-Fi system and the WiGig system. In addition, the wireless communication apparatus 130 includes an antenna 311a to be used in Wi-Fi wireless communication and an antenna 312a to be used in WiGig wireless communication and supports the two transmission systems of the Wi-Fi system and the WiGig system. Further, the access point apparatus 110 includes an antenna 110a to be used in a Wi-Fi wireless communication. In this case, the Wi-Fi wireless communication includes wireless communication in an infrastructure mode and wireless communication in an ad-hoc mode.

Referring to FIG. 2, when the wireless communication apparatuses 120 and 130 perform wireless communication in a Wi-Fi system infrastructure mode, the access point apparatus 110 establishes Wi-Fi wireless communication with the wireless communication apparatus 120 and Wi-Fi wireless communication with the wireless communication apparatus 130. Then, for the purpose of wireless transmission of data to the wireless communication apparatus 130, the wireless communication apparatus 120 wirelessly transmits data to the access point apparatus 110 via a communication path P1 between the wireless communication apparatus 120 and the access point apparatus 110. The data from the wireless communication apparatus 120 is relayed by the access point apparatus 110 and transmitted to the wireless communication apparatus 130 via a communication path P2 between the access point apparatus 110 and the wireless communication apparatus 130. Therefore, on the condition that the wireless communication apparatus 120 can establish wireless communication with the access point apparatus 110, the wireless communication apparatus 120 can wirelessly transmit data to the wireless communication apparatus 130 via an indirect communication path Pi including the communication paths P1 and P2 without establishing wireless communication with the wireless communication apparatus 130. In a manner similar to that of the wireless communication apparatus 120, on the condition that the wireless communication apparatus 130 can establish wireless communication with the access point apparatus 110, the wireless communication apparatus 130 can wirelessly transmit data to the wireless communication apparatus 120 via the indirect communication path Pi without establishing wireless communication with the wireless communication apparatus 120.

In addition, referring to FIG. 2, when the wireless communication apparatuses 120 and 130 perform wireless communication in a Wi-Fi system ad-hoc mode, the wireless communication apparatuses 120 and 130 directly transmit and receive data via a direct communication path Pd. In addition, when the wireless communication apparatuses 120 and 130 perform wireless communication in the WiGig system, the wireless communication apparatuses 120 and 130 transmit and receive data via the direct communication path Pd without transmitting and receiving data by the access point apparatus 110.

Referring to FIG. 3, the wireless communication apparatus 120 includes a wireless transmitter and receiver unit 211, a wireless transmitter and receiver unit 212, a received power measuring unit 220, a communication frame processing unit 230, a memory unit 240, a direction information acquisition unit 250, a transmission system judgment information storage unit 260, a transmission system judging unit 270, an input and output unit 280, and a communication frame generator unit 290. The wireless transmitter and receiver unit 211 is a wireless communication circuit (device) in conformity with the Wi-Fi system and includes the antenna 211a, a feed module connected to the antenna 211a, and a tuner. The wireless transmitter and receiver unit 211 receives a wireless signal transmitted from the access point apparatus 110 or the wireless communication apparatus 130 by using the antenna 211a, performs a predetermined interface process on the received wireless signal, and outputs the signal to the received power measuring unit 220. In addition, the wireless transmitter and receiver unit 211 performs a predetermined interface process on a communication frame from the communication frame generator unit 290 and wirelessly transmits the communication frame to the access point apparatus 110 or the wireless communication apparatus 130 via the antenna 211a.

In addition, the wireless transmitter and receiver unit 212 is a wireless communication circuit (device) in conformity with the WiGig system and includes the antenna 212a, a feed module connected to the antenna 212a, and a tuner. The wireless transmitter and receiver unit 212 receives the wireless signal transmitted from the wireless communication apparatus 130 by using the antenna 212a, performs a predetermined interface process on the received wireless signal, and outputs the signal after the interface process to the received power measuring unit 220. In addition, the wireless transmitter and receiver unit 212 performs a predetermined interface process on a communication frame from the communication frame generator unit 290 and wirelessly transmits the communication frame after the interface process to the wireless communication apparatus 130 via the antenna 212a. Further, the received power measuring unit 220 outputs the input wireless signal to the communication frame processing unit 230, and also measures a Received Signal Strength Indicator (hereinafter, referred to as RSSI) of the input wireless signal and outputs the measured RSSI to the memory unit 240.

The communication frame processing unit 230 performs predetermined processes such as a frequency converting process and an intermediate frequency process on the received wireless signal, then, demodulates the received wireless signal to the communication frame of the received signal, extracts logical data from a packet contained in the communication frame, and outputs the logical data to the memory unit 240. In this case, the logical data extracted from the communication frame contains, for example, frequencies supported by a transmitter wireless terminal apparatus and a channel available within the frequencies as well as information including an encryption method supported by the transmitter terminal apparatus.

The memory unit 240 includes a memory device such as a Read Only Memory (ROM) or a Random Access Memory (RAM) and stores the RSSI measured by the received power measuring unit 220 and the logical data extracted by the communication frame processing unit 230. The data stored in the memory unit 240 is referred to by the transmission system judging unit 270 as described in detail later.

The direction information acquisition unit 250 includes a direction sensor such as a magnetic field sensor. The direction information acquisition unit 250 detects a direction of main beam of the antenna 212a used in WiGig wireless communication (a direction with the highest gain, hereinafter, referred to as the direction of the antenna 212a), and outputs the direction to the transmission system judging unit 270.

In addition, the transmission system judgment information storage unit 260 includes a memory device such as a ROM, an EEPROM, or a flash memory. The transmission system judgment information storage unit 260 previously stores a strength threshold Th120 of the RSSI measured when the wireless communication apparatus 120 received a wireless signal that contains a WiGig Switching Response Frame F2 (to be described in detail later) from the wireless communication apparatus 130 in the Wi-Fi system ad-hoc mode by using the antenna 211a and a direction range α within which the wireless communication apparatus 120 can transmit and receive a wireless signal by using the antenna 212a (a range from the direction of the main beam of the antenna 212a). In this case, the strength threshold Th120 is used by the transmission system judging unit 270 for judging whether or not the wireless communication apparatus 120 can perform wireless communication with the wireless communication apparatus 130 in the WiGig system by using the antenna 212a as described in detail later. It is to be noted that the Wi-Fi system and the WiGig system use different frequency bands and different modulation methods. In general, since the WiGig system provides a limited communication range as compared with the Wi-Fi system, the wireless communication apparatus 120 sometimes cannot perform a WiGig wireless communication by using the antenna 212a even if the wireless communication apparatus 120 can perform a Wi-Fi wireless communication by using the antenna 211a. Therefore, the strength threshold Th120 of the RSSI is set in consideration of differences between the Wi-Fi system and the WiGig system based on the relationship between the RSSI measured when the wireless communication apparatus 120 received a wireless signal in the Wi-Fi system ad-hoc mode by using the antenna 211a and the RSSI measured when the wireless communication apparatus 120 received a wireless signal in the WiGig system by using the antenna 212a.

The transmission system judging unit 270 judges the Wi-Fi system or the WiGig system to be the transmission system for performing wireless communication with the wireless communication apparatus 130, causes one of the wireless transmitter and receiver units 211 and 212 that corresponds to the judged transmission system to operate, and controls the communication frame generator unit 290 to generate a communication frame to be transmitted. In addition, the transmission system judging unit 270 performs the WiGig switching request process of FIG. 5 as described in detail later.

Further, the input and output unit 280 is a user interface provided with an output apparatus such as a display unit configured to display a character, an image, a video, and the like and an input apparatus such as a touch panel. The communication frame generator unit 290 divides the data to be transmitted into predetermined data units such as communication frames, under the control of the transmission system judging unit 270, outputs the divided communication frames to the wireless transmitter and receiver unit 211 or the wireless transmitter and receiver unit 212, and wirelessly transmits the communication frames. It is to be noted that the wireless communication apparatus 120 implements the received power measuring unit 220, the communication frame processing unit 230, the transmission system judging unit 270, and the communication frame generator unit 290 by executing software programs corresponding to the functions of the respective units by using an arithmetic unit.

Referring to FIG. 4, the wireless communication apparatus 130 includes a wireless transmitter and receiver unit 311, a wireless transmitter and receiver unit 312, a received power measuring unit 320, a communication frame processing unit 330, a memory unit 340, a direction information acquisition unit 350, a transmission system judgment information storage unit 360, a transmission system judging unit 370, an input and output unit 380, and a communication frame generator unit 390. In this case, the configurations and the operations of the wireless transmitter and receiver unit 311, the wireless transmitter and receiver unit 312, the received power measuring unit 320, the communication frame processing unit 330, the memory unit 340, the direction information acquisition unit 350, the transmission system judging unit 370, the input and output unit 380, and the communication frame generator unit 390 are similar to those of the wireless transmitter and receiver unit 211, the wireless transmitter and receiver unit 212, the received power measuring unit 220, the communication frame processing unit 230, the memory unit 240, the direction information acquisition unit 250, the transmission system judging unit 270, the input and output unit 280, and the communication frame generator unit 290 of the wireless communication apparatus 120, respectively, and thus the description of them will be omitted.

Meanwhile, referring to FIG. 4, the transmission system judgment information storage unit 360 previously stores a strength threshold Th130 of the RSSI measured when the wireless communication apparatus 130 received a wireless signal that contains a WiGig Switching Request Frame F1 (to be described in detail later) from the wireless communication apparatus 120 in the Wi-Fi system ad-hoc mode by using the antenna 311a and a direction range $\beta$ (which is a direction range from the direction of the main beam of the antenna 312a), within which the wireless communication apparatus 130 can transmit and receive a wireless signal by using the antenna 312a. In this case, the strength threshold Th130 is used for judgment of whether or not the wireless communication apparatus 130 can perform wireless communication with the wireless communication apparatus 120 in the WiGig system by using the antenna 312a as described in detail later. It is to be noted that, as described above, the Wi-Fi system and the WiGig system use different frequency bands and different modulation methods. Therefore, the strength threshold Th130 of the RSSI is set in consideration of differences between the Wi-Fi system and the WiGig system based on the relationship between the RSSI measured when the wireless communication apparatus 130 received a wireless signal in the Wi-Fi system ad-hoc mode by using the antenna 311a and the RSSI measured when the wireless communication apparatus 130 received a wireless signal in the WiGig system by using the antenna 312a.

In addition, the antenna 211a of the wireless communication apparatus 120 and the antenna 311a of the wireless communication apparatus 130 have properties different from each other and the antenna 212a of the wireless communication apparatus 120 and the antenna 312a of the wireless communication apparatus 130 have properties different from each other. As a result, the strength threshold Th120 stored in the transmission system judgment information storage unit 260 and the strength threshold Th130 stored in the transmission system judgment information storage unit 360 are different from each other and the direction range $\alpha$ stored in the transmission system judgment information storage unit 260 and the direction range $\beta$ stored in the transmission system judgment information storage unit 360 are different from each other.

Hereinafter, the description will be made on the WiGig switching request process (FIG. 5) performed by the transmission system judging unit 270 and the WiGig switching response process (FIG. 6A and FIG. 6B) performed by the transmission system judging unit 370, when the wireless communication apparatus 120 requests the wireless communication apparatus 130 to switch over the transmission system for performing wireless communication between the wireless communication apparatus 120 and the wireless communication apparatus 130 to a WiGig system in the wireless communication system 100 of FIG. 1.

Referring to FIG. 5, first of all, in step S1, when the wireless communication apparatus 120 performs data communication in the Wi-Fi system infrastructure mode, the transmission system judging unit 270 judges whether or not to request the wireless communication apparatus 130 to switch over the transmission system for performing wireless communication with the wireless communication apparatus 130, from the Wi-Fi system to the WiGig system. Specifically, when a user enters instructions to switch over the transmission system from the Wi-Fi system to the WiGig system by using the input and output unit 280, the transmission system judging unit 270 judges YES in step S1. In step S1, in the case where the transmission system judging unit 270 has judged YES, the process proceeds to step S2, whereas in the case where the transmission system judging unit 270 has judged NO, the process repeats the processing of step S1. It is to be noted that, when the wireless communication apparatus 120 performs data communication in the Wi-Fi system infrastructure mode, the power is supplied to the wireless transmitter and receiver unit 211, however, on the other hand, the wireless transmitter and receiver unit 212 is not activated since the power is not supplied to the wireless transmitter and receiver unit 212.

In step S2, the transmission system judging unit 270 transmits a WiGig Switching Request Frame F1 to the wireless communication apparatus 130 in the Wi-Fi system ad-hoc mode. In this case, the WiGig Switching Request Frame F1 contains information about the direction of the antenna 212a acquired by the direction information acquisition unit 250 and information about a channel used in the WiGig system supported by the wireless communication apparatus 120 (hereinafter, referred to as WiGig support channel). In this case, the wireless communication apparatus 120 can directly transmit the WiGig Switching Request Frame F1 to the wireless communication apparatus 130 by setting a destination address of the WiGig Switching Request Frame F1 to a MAC address of the wireless communication apparatus 130. It is to be noted that the format of the WiGig Switching Request Frame F1 will be described in detail later.

Next, in step S3, the transmission system judging unit 270 receives a WiGig Switching Response Frame F2 from the wireless communication apparatus 130 in the Wi-Fi system ad-hoc mode. In this case, the WiGig Switching Response Frame F2 contains a Status field F25 and information about the direction of the antenna 312a of the wireless communication apparatus 130. The Status field F25 stores data indicating whether or not to accept performance of wireless communication in the WiGig system. It is to be noted that, in the case where the wireless communication apparatus 130 accepts performance of wireless communication in the WiGig system with the wireless communication apparatus 120, one is set to the Status field F25. The format of the WiGig Switching Response Frame F2 will be described in detail later.

In step S4, the transmission system judging unit 270 judges whether or not one is set to the Status field F25 contained in the WiGig Switching Response Frame F2, and in the case where the transmission system judging unit 270 has judged YES, the process proceeds to step S5, whereas in the case where the transmission system judging unit 270 has judged NO, the process returns to step S1. In step S5, the transmission system judging unit 270 judges whether or not the RSSI which was measured when the wireless communication apparatus 120 received the WiGig Switching Response Frame F2 and is stored in the memory unit 240 is equal to or larger than the strength threshold Th120 which is stored in the transmission system judgment information storage unit 260. Then, in step S5, in the case where the transmission system judging unit 270 has judged YES, the process proceeds to step S6, whereas in the case where the transmission system judging unit 270 has judged NO, the process returns to step S1.

Further, in step S6 of FIG. 5, the transmission system judging unit 270 judges whether or not there is a possibility that the main beam of the antenna 312a overlaps the main beam of the antenna 212a. Specifically, the transmission system judging unit 270 judges whether or not there is a possibility that the main beam of the antenna 312a overlaps the main beam of the antenna 212a based on the direction of the antenna 312a contained in the WiGig Switching Response Frame F2, the direction of the antenna 212a acquired by the direction information acquisition unit 250, and the direction range α stored in the transmission system judgment information storage unit 260. Then, in step S6, in the case where the transmission system judging unit 270 has judged YES, the process proceeds to step S7, whereas in the case where the transmission system judging unit 270 has judged NO, the process returns to step S1.

Figure 7:
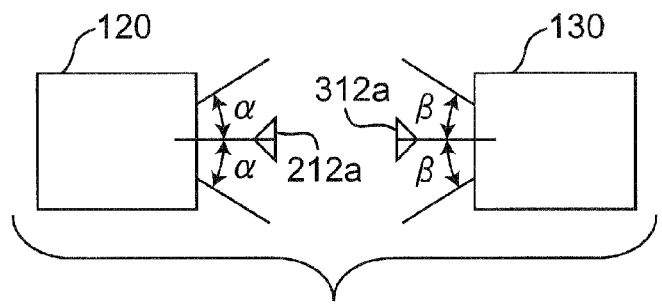
FIG. 7 is a plan view illustrating an example of orientations and positions of the wireless communication apparatuses 120 and 130 of FIG. 1 when it is judged YES in step S6 of FIG. 5 and step S25 of FIG. 6A.
Figure 8:
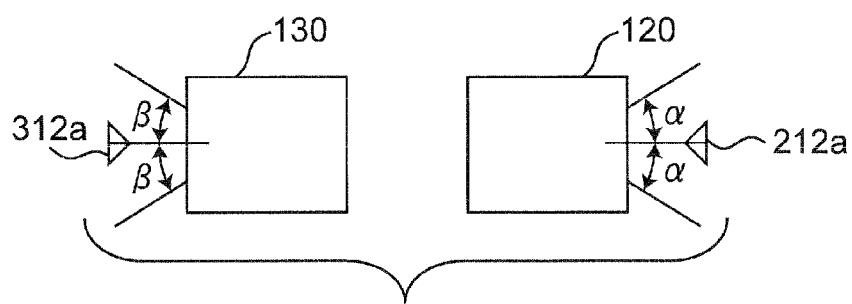
FIG. 8 is a plan view illustrating another example of orientations and positions of the wireless communication apparatuses 120 and 130 of FIG. 1 when it is judged YES in step S6 of FIG. 5 and step S25 of FIG. 6A.
Figure 9:
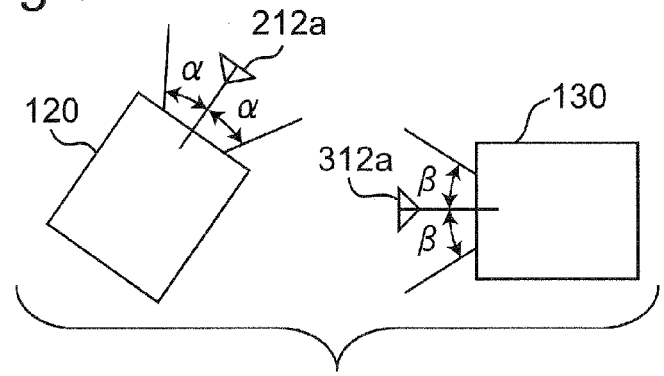
FIG. 9 is a plan view illustrating an example of orientations and positions of the wireless communication apparatuses 120 and 130 of FIG. 1 when it is judged NO in step S6 of FIG. 5 and step S25 of FIG. 6A.

FIG. 7 is a plan view illustrating an example of orientations and positions of the wireless communication apparatuses 120 and 130 of FIG. 1 when it is judged YES in step S6 of FIG. 5 and step S25 of FIG. 6A. In addition, FIG. 8 is a plan view illustrating another example of orientations and positions of the wireless communication apparatuses 120 and 130 of FIG. 1 when it is judged YES in step S6 of FIG. 5 and step S25 of FIG. 6A. Further, FIG. 9 is a plan view illustrating an example of orientations and positions of the wireless communication apparatuses 120 and 130 of FIG. 1 when it is judged NO in step S6 of FIG. 5 and step S25 of FIG. 6A.

In general, the antenna 212a which is used for communication in the WiGig system has higher directivity than that of the antenna 211a which is used for communication in the Wi-Fi system. Therefore, there is a probability that the wireless communication apparatuses 120 and 130 cannot perform wireless communication in the WiGig system even if the wireless communication apparatuses 120 and 130 can perform in wireless communication in the Wi-Fi system. For example, when the antenna 212a faces east and the antenna 312a faces west as illustrated in FIG. 7, the wireless communication apparatuses 120 and 130 can perform wireless communication on the condition that the antenna 212a and the antenna 312a face each other. However, in the case where the antenna 212a and the antenna 312a do not face each other as illustrated in FIG. 8, the wireless communication apparatuses 120 and 130 cannot perform wireless communication. In addition, when the antenna 212a faces northeast and the antenna 312a faces west as illustrated in FIG. 9, there is a high probability that the wireless communication apparatuses 120 and 130 cannot perform in wireless communication no matter what the positions of the wireless communication apparatuses 120 and 130 are. With the processing in step S6 of FIG. 5, the wireless communication apparatus 120 can stop switching over the transmission system for performing wireless communication with the wireless communication apparatus 130 to the WiGig system in the case where the wireless communication apparatuses 120 and 130 obviously cannot perform wireless communication in the WiGig system.

Referring back to FIG. 5 again, in step S7, the transmission system judging unit 270 judges whether or not the user has agreed to switch over the transmission system for performing wireless communication with the wireless communication apparatus 130 from the Wi-Fi system to the WiGig system, and in the case where the transmission system judging unit 270 has judged YES, the process proceeds to step S8, whereas in the case where the transmission system judging unit 270 has judged NO, the process returns to step S1. Specifically, the transmission system judging unit 270 causes the input and output unit 280 to present a predetermined display for asking if the user agrees to switch over the transmission system for performing wireless communication with the wireless communication apparatus 130 from the Wi-Fi system to the WiGig system, and in the case where the user has agreed to switch, the process proceeds to step S8. In this manner, it is possible to prevent the wireless communication apparatus 120 from switching over the transmission system at an unexpected timing for the user. Therefore, it is possible to prevent the wireless communication apparatus 120 from being disconnected without permission of the user when the wireless communication apparatus 120 is connected with an external network such as the Internet via the access point apparatus 110.

In the case where the transmission system judging unit 270 has judged NO in step S4, S5, S6, or S7 of FIG. 5, the process returns to step S1 and the data communication in the Wi-Fi system infrastructure mode is maintained. In step S8 of FIG. 5, the transmission system judging unit 270 transmits an acknowledgement (Ack) to the wireless communication apparatus 130 in the Wi-Fi system ad-hoc mode. In this manner, the transmission system judging unit 270 notifies the wireless communication apparatus 130 that the wireless communication apparatus 120 has decided to switch over the transmission system for performing wireless communication with the wireless communication apparatus 130 to the WiGig system. Next, in step S9, the transmission system judging unit 270 supplies the power to the wireless transmitter and receiver unit 212 to activate the wireless transmitter and receiver unit 212 and performs a connection process such as a negotiation process with the wireless communication apparatus 130 in the WiGig system ad-hoc mode. Next, in step S10, data communication in the WiGig system is performed and the WiGig switching request process ends.

Next, the WiGig switching response process of FIG. 6A and FIG. 6B will be described. First of all, in step S21, when the wireless communication apparatus 130 performs data communication in the Wi-Fi system infrastructure mode, the transmission system judging unit 370 judges whether the wireless communication apparatus 130 has received the WiGig Switching Request Frame F1 from the wireless communication apparatus 120 in the Wi-Fi system ad-hoc mode. Then, in step S21, in the case where the transmission system judging unit 370 has judged YES, the process proceeds to step S22, whereas in the case where the transmission system judging unit 370 has judged NO, the process repeats the processing of step S21. It is to be noted that, when the wireless communication apparatus 130 performs data communication in the Wi-Fi system infrastructure mode, the power is supplied to the wireless transmitter and receiver unit 311, however, on the other hand, the wireless transmitter and receiver unit 312 is not activated since the power is not supplied to the wireless transmitter and receiver unit 312. In step S22, the transmission system judging unit 370 judges whether or not the wireless communication apparatus 130 supports at least one of the WiGig support channels contained in the WiGig Switching Request Frame F1, and in the case where the transmission system judging unit 370 has judged YES, the process proceeds to step S24, whereas in the case where the transmission system judging unit 370 has judged NO, the process proceeds to step S23.

In step S23, the transmission system judging unit 370 sets two to the Status field F25 of the WiGig Switching Response Frame F2 and transmits the WiGig Switching Response Frame F2 to the wireless communication apparatus 120 in the Wi-Fi system ad-hoc mode, and then the process returns to step S21. It is to be noted that the data of two that is set to the Status field F25 represents that the wireless communication apparatus 120 cannot perform communication in the WiGig system. In this case, on the condition that the wireless communication apparatuses 120 and 130 have a possibility to perform communication in the WiGig system by a user's predetermined operation, the wireless communication apparatus 130 may use the input and output unit 380 or the like and prompt the user to correct the position or the direction of the wireless communication apparatus 120 or the wireless communication apparatus 130. Specifically, for example, in the case where the RSSI is smaller than the strength threshold Th130, the wireless communication apparatus 130 may use the input and output unit 380 and prompt the user to move the wireless communication apparatus 130 nearer to the wireless communication apparatus 120. In addition, in step S24, the transmission system judging unit 370 judges whether or not the RSSI which was measured when the wireless communication apparatus 130 received the WiGig Switching Request Frame F1 and is stored in the memory unit 340 is equal to or larger than the strength threshold Th130 which is stored in the transmission system judgment information storage unit 360. Then, in step S24, in the case where the transmission system judging unit 370 has judged YES, the process proceeds to step S25, whereas in the case where the transmission system judging unit 370 has judged NO, the process proceeds to step S23.

In step S25, the transmission system judging unit 370 judges whether or not there is a possibility that the main beam of the antenna 212a overlaps the main beam of the antenna 312a, and in the case where the transmission system judging unit 370 has judged YES, the process proceeds to step S26, whereas in the case where the transmission system judging unit 370 has judged NO, the process proceeds to step S27. Specifically, the transmission system judging unit 370 judges whether or not there is a possibility that the main beam of the antenna 212a overlaps the main beam of the antenna 312a based on the direction of the antenna 212a contained in the WiGig Switching Request Frame F1, the direction of the antenna 312a acquired by the direction information acquisition unit 350, and the direction range β stored in the transmission system judgment information storage unit 360. Then, in step S25, in the case where the transmission system judging unit 370 has judged YES, the process proceeds to step S26, whereas in the case where the transmission system judging unit 370 has judged NO, the process proceeds to step S23. It is to be noted that the processing in step S25 is similar to the processing in step S6 of FIG. 5.

In step S26, the transmission system judging unit 370 judges whether or not the user has agreed to switch over the transmission system for performing wireless communication with the wireless communication apparatus 120 to the WiGig system, and in the case where the transmission system judging unit 370 has judged YES, the process proceeds to step S28 of FIG. 6B, whereas in the case where the transmission system judging unit 370 has judged NO, the process proceeds to step S27. Specifically, the transmission system judging unit 370 causes the input and output unit 380 to present a predetermined display for asking if the user agrees to switch over the transmission system for performing wireless communication with the wireless communication apparatus 120 to the WiGig system, and in the case where the user has agreed to switch, the process proceeds to step S28. In this manner, the transmission system judging unit 370 can prevent the wireless communication apparatus 130 from switching over the transmission system at an unexpected timing for the user. Therefore, it is possible to prevent the wireless communication apparatus 130 from being disconnected without permission of the user when the wireless communication apparatus 130 is connected with an external network such as the Internet via the access point apparatus 110.

In step S27, the transmission system judging unit 370 sets zero to the Status field F25 of the WiGig Switching Response Frame F2 and transmits the WiGig Switching Response Frame F2 to the wireless communication apparatus 120 in the Wi-Fi system ad-hoc mode, and then the process returns to step S21. It is to be noted that the data of zero that is set to the Status field F25 represents that the wireless communication apparatus 130 denies communication in the WiGig system.

In step S28 of FIG. 6B, the transmission system judging unit 370 sets one to the Status field F25 of the WiGig Switching Response Frame F2 and transmits the WiGig Switching Response Frame F2 to the wireless communication apparatus 120 in the Wi-Fi system ad-hoc mode, and then the process proceeds to step S29. It is to be noted that the data of one that is set to the Status field F25 represents that the wireless communication apparatus 130 accepts communication in the WiGig system. Next, in step S29, the transmission system judging unit 370 judges whether or not the acknowledgement (Ack) has been received from the wireless communication apparatus 120 within a predetermined time period, and in the case where the transmission system judging unit 370 has judged YES, the process proceeds to step S30, whereas in the case where the transmission system judging unit 370 has judged NO, the process returns to step S21. In step S30, the transmission system judging unit 370 activates the wireless transmitter and receiver unit 312 and performs a connection process such as a negotiation process with the wireless communication apparatus 120 in the WiGig system ad-hoc mode. Next, in step S31, data communication in the WiGig system is performed and the WiGig switching response process ends.

Next, the formats of the WiGig Switching Request Frame F1 and the WiGig Switching Response Frame F2 will be described. FIG. 10 is a format diagram showing the format of the WiGig Switching Request Frame F1 transmitted in step S2 of FIG. 5. In addition, FIG. 11 is a format diagram showing the format of the WiGig Switching Response Frame F2 transmitted in step S28 of FIG. 6B. The WiGig Switching Request Frame F1 and the WiGig Switching Response Frame F2 can be implemented by new definition of values to be stored in an Action Value field contained in an Action frame which is defined in IEEE 802.11.

Referring to FIG. 10, the WiGig Switching Request Frame F1 contains a Category field F11, an Action Value field F12, a Direction field F13, and a WiGig Support Channel field F14. In addition, referring to FIG. 11, the WiGig Switching Response Frame F2 contains a Category field F21, an Action Value field F22, a Direction field F23, a WiGig Support Channel field F24, and a Status field F25.

FIG. 12 is a table showing values (codes) to be set to the Category fields F11 and F21 of FIG. 10 and FIG. 11. Values from 0 to 255 are set to the Category fields F11 and F21. Zero set to the Category field F11 or F21 represents that the Action frame containing the Category field F11 or F21 is a Spectrum Management frame for making a request to change a transmission channel configuration. In addition, one set to the Category field F11 or F21 represents that the Action frame containing the Category field F11 or F21 is a Quality of Service (QoS) frame for making a request to change a QoS configuration. Further, two set to the Category field F11 or F21 represents that the Action frame containing the Category field F11 or F21 is a Direct-Link Setup (DLS) frame for making a request to change a DLS configuration.

In addition, three set to the Category field F11 or F21 represents that the Action frame containing the Category field F11 or F21 is a Block Acknowledgement (Block Ack) frame. Further, the values from 4 to 126 which are reserved numbers in the Category fields F11 and F21 will be assigned to codes that will be added in future. Furthermore, 127 set to the Category field F11 or F21 represents that the Action frame containing the Category field F11 or F21 is a Vendor-specific frame which makes a request to perform a process uniquely set by a vendor that has developed the wireless communication apparatus. In addition, in the case where the value from 128 to 255 is set to the Category field F11 or F21, the Action frame containing the Category field F11 or F21 is originally not to be transmitted and received, and thus is an object of an error process.

FIG. 13 is a table showing values to be set to the Action Value fields F12 and F22 of FIG. 10 and FIG. 11 when zero is set to the Category fields F11 and F21 of FIG. 10 and FIG. 11. Values from 0 to 255 are set to the Action Value fields F12 and F22. Zero set to the Action Value field F12 or F22 represents that the Action frame containing the Action Value field F12 or F22 is a Management Request frame which requests the other wireless communication apparatus to measure one or more pieces of channel information. In addition, one set to the Action Value field F12 or F22 represents that the Action frame containing the Action Value field F12 or F22 is a Management Response frame which is a response frame for the above described Management Request frame.

In addition, two set to the Action Value field F12 or F22 represents that the Action frame containing the Action Value field F12 or F22 is a Transmit Power Control (TPC) Request frame for requesting the other wireless communication apparatus to give information about TPC and a transmission rate. Further, three set to the Action Value field F12 or F22 represents that the Action frame containing the Action Value field F12 or F22 is a TPC Response frame which is a response frame for the above described TPC Request frame. Furthermore, four set to the Action Value field F12 or F22 represents that the Action frame containing the Action Value field F12 or F22 is a Channel Switch Announcement frame which makes a request to change the currently used channel.

In addition, five set to the Action Value field F12 or F22 represents that the Action frame containing the Action Value field F12 or F22 is the WiGig Switching Request Frame F1 which makes a request to switch over the transmission system for performing wireless communication between the wireless communication apparatuses 120 and 130 from the Wi-Fi system to the WiGig system. Further, six set to the Action Value field F12 or F22 represents that the Action frame containing the Action Value field F12 or F22 is the WiGig Switching Response Frame F2 which is a response frame for the WiGig Switching Request Frame F1. Further, the values from 7 to 255, which are reserved numbers in the Action Value fields F12 and F22, will be assigned to codes that will be added in future. As shown in FIG. 13, in the first embodiment, the values 5 and 6, which are reserved numbers in the Action Value field in the Action frame defined in IEEE 802.11, are used for definition of the WiGig Switching Request Frame F1 and the WiGig Switching Response Frame F2.

FIG. 14 is a table showing values to be set to the Direction fields F13 and F23 of FIG. 10 and FIG. 11. The value from 0 to 359 that is set to the Direction field F13 or F23 indicates the direction of the main beam of the antenna used for wireless communication in the WiGig system belonging to the source wireless communication apparatus of the Action frame that contains the Direction field F13 or F23. For example, zero set to the Direction field F13 represents that the direction in which the most strong wave is transmitted from the source wireless communication apparatus of the Action frame that contains the Direction field F13 in the WiGig system is due north, i.e., the direction of 0 degrees. In addition, 90 set to the Direction field F13 represents that the direction in which the most strong wave is transmitted from the source wireless communication apparatus of the Action frame that contains the Direction field F13 in the WiGig system is due east, i.e., the direction of 90 degrees. In the case where the value from 360 to 65535 is set to the Direction field F13 or F23, the Action frame that contains the Direction field F13 or F23 is originally not to be transmitted and received, and thus is an object of an error process.

FIG. 15 is a table showing values to be set to the WiGig Support Channel fields F14 and F24 of FIG. 10 and FIG. 11. Optional values are set to the WiGig Support Channel fields F14 and F24. In each of the WiGig Support Channel fields F14 and F24, channel numbers of channels used in the WiGig system supported by the source wireless communication apparatus of the Action frame that contains the WiGig Support Channel field are set. For example, in the case where the number "020304" is set to the WiGig Support Channel field F14, the source wireless communication apparatus of the Action frame that contains the WiGig Support Channel field F14 supports 2ch, 3ch, and 4ch among channels for the WiGig system.

FIG. 16 is a table showing values to be set to the Status field F25 of FIG. 11. A value from 0 to 255 is set to the Status field F25. Zero set to the Status field F25 represents that the wireless communication apparatus that has received the WiGig Switching Request Frame F1 denies switchover of the transmission system for performing wireless communication between the wireless communication apparatuses 120 and 130 from the Wi-Fi system to the WiGig system. In addition, one set to the Status field F25 represents that the wireless communication apparatus that has received the WiGig Switching Request Frame F1 accepts the above described switchover of transmission system from the Wi-Fi system to the WiGig system. Further, two set to the Status field F25 represents that the wireless communication apparatus that has received the WiGig Switching Request Frame F1 cannot switch over the above described transmission system from the Wi-Fi system to the WiGig system. Specifically, in the case where the distance between the wireless communication apparatuses 120 and 130 is longer than the distance within which the wireless communication apparatuses 120 and 130 can perform communication in the WiGig system, in the case where the main beams of the antennas of the respective wireless communication apparatuses 120 and 130 used for wireless communication in the WiGig system are not overlap each other, or in the case where the WiGig support channels of the respective wireless communication apparatuses 120 and 130 do not agree with each other, the wireless communication apparatuses 120 and 130 cannot switch over the transmission system for performing wireless communication between the wireless communication apparatuses 120 and 130 from the Wi-Fi system to the WiGig system. In addition, in the case where the value from 3 to 255 is set to the Status field F25, the Action frame that contains the Status field F25 is an object of an error process.

FIG. 17 is a table showing values to be set to the respective fields F11, F12, F13, and F14 of the WiGig Switching Request Frame F1 transmitted in step S2 of FIG. 5. As shown in FIG. 17, five is set to the Action Value field F12 in the WiGig Switching Request Frame F1. In addition, FIG. 18 is a table showing values set to the respective fields F21, F22, F23, F24, and F25 of the WiGig Switching Response Frame F2 transmitted in step S28 of FIG. 6B. As shown in FIG. 18, six is set to the Action Value field F22 in the WiGig Switching Response Frame F2.

Next, an example of operation of the wireless communication system 100 of FIG. 1 will be described.

FIG. 19 is a timing chart showing an operation of the wireless communication system 100 of FIG. 1 when the wireless communication system 100 switches over the transmission system for performing wireless communication between the wireless communication apparatuses 120 and 130 from the infrastructure mode of a Wi-Fi system to a WiGig system. In step S301 of FIG. 19, the wireless communication apparatus 120 transmits data to the wireless communication apparatus 130 via the access point apparatus 110 in the Wi-Fi system infrastructure mode.

Next, in response to instructions to switch over the transmission system for performing wireless communication between the wireless communication apparatuses 120 and 130 to the WiGig system entered by the user into the wireless communication apparatus 120 from the input and output unit 280, in step S302, the wireless communication apparatus 120 transmits the WiGig Switching Request Frame F1 to the wireless communication apparatus 130 in the Wi-Fi system ad-hoc mode. FIG. 20 is a table showing values to be set to the respective fields F11, F12, F13, and F14 of the WiGig Switching Request Frame F1 transmitted in step S302 of FIG. 19. As described above, five is set to the Action Value field F12 in the WiGig Switching Request Frame F1.

In step S303 of FIG. 19, in response to the WiGig Switching Request Frame F1, the wireless communication apparatus 130 measures the RSSI at the time of receiving the WiGig Switching Request Frame F1 by using the received power measuring unit 320 and also extracts logical data from the WiGig Switching Request Frame F1 by using the communication frame processing unit 330. In addition, the transmission system judging unit 370 of the wireless communication apparatus 130 judges whether or not to accept the switchover of the transmission system for performing wireless communication with the wireless communication apparatus 120 to the WiGig system by using the RSSI measured by the received power measuring unit 320, the information about the WiGig support channels contained in the WiGig Switching Request Frame F1, the strength threshold Th130 and the direction range β stored in the transmission system judgment information storage unit 360, and the direction of the antenna 312a acquired by the direction information acquisition unit 350. Then, the wireless communication apparatus 130 sets data indicating the judgment result to the Status field F25 and transmits the WiGig Switching Response Frame F2 to the wireless communication apparatus 120. FIG. 21 is a table showing the values to be set to the respective fields F21, F22, F23, F24, and F25 of the WiGig Switching Response Frame F2 transmitted in step S303 of FIG. 19. As shown in FIG. 21, six is set to the Action Value field F22 in the WiGig Switching Response Frame F2. In addition, in the example of FIG. 21, one is set to the Status field F25.

In response to reception of the WiGig Switching Response Frame F2, in step S304 of FIG. 19, the wireless communication apparatus 120 judges whether or not one is set to the Status field F25 in the WiGig Switching Response Frame F2. Then, in the case where one is set to the Status field F25 (i.e., YES in step S4 of FIG. 5) and it is judged YES in steps S5, S6, and S7 of FIG. 5, the wireless communication apparatus 120 transmits the acknowledgement (Ack) to the wireless communication apparatus 130.

Referring to FIG. 19, each processing of steps S302 to S304 is performed in the Wi-Fi system ad-hoc mode. In addition, the wireless communication apparatus 120 keeps the data communication in the Wi-Fi system infrastructure mode in each processing of steps S302 to S304. It is to be noted that, in step S304, the wireless communication apparatus 120 may transmit the acknowledgement (Ack) in the Wi-Fi system infrastructure mode.

Next, in step S305, the wireless communication apparatuses 120 and 130 perform a WiGig connection process such as a negotiation for transmitting and receiving data in the WiGig system by transmitting and receiving a predetermined control frame in the WiGig system. It should be noted that the WiGig connection process is a publicly known process in conformity with the WiGig standard.

In response to completion of the WiGig connection process, in step S306, the wireless communication apparatus 120 directly transmits data to the wireless communication apparatus 130 in the WiGig system. When the wireless communication apparatus 120 finishes the data transmission, the wireless communication apparatus 120 transmits, to the wireless communication apparatus 130, a Disassociation Request Frame for notifying that the data communication has finished. In response to the Disassociation Request Frame, the wireless communication apparatus 130 transmits a Disassociation Response Frame to the wireless communication apparatus 120 and finishes the communication in the WiGig system.

Next, each of the wireless communication apparatuses 120 and 130 transmits, to the access point apparatus 110 in the Wi-Fi system ad-hoc mode, a Reassociation Frame for notifying that the transmission system for performing wireless communication between the wireless communication apparatuses 120 and 130 is to be restored to the Wi-Fi system infrastructure mode. Then, the data communication in the Wi-Fi system infrastructure mode is resumed. However, the wireless communication apparatuses 120 and 130 do not necessarily have to cut off the WiGig communication when the wireless communication apparatuses 120 and 130 have completed the data transmission in the WiGig system. For example, when both of the wireless transmitter and receiver units 311 and 312 are concurrently ready to operate in the wireless communication apparatus 130, the wireless communication apparatus 130 may perform wireless communication with the access point apparatus 110 in the Wi-Fi system upon performing wireless communication with the wireless communication apparatus 120 in the WiGig system. In this case, the wireless communication apparatus 130 can connect with the Internet via the access point apparatus 110 upon performing a data transfer process to the wireless communication apparatus 120.

As described above, the wireless communication apparatus 120 includes the wireless transmitter and receiver unit 211 configured to perform wireless communication in the Wi-Fi system, the wireless transmitter and receiver unit 212 configured to perform wireless communication in the WiGig system, and the transmission system judging unit 270 configured to control the wireless transmitter and receiver units 211 and 212. In this case, the transmission system judging unit 270 controls the wireless transmitter and receiver unit 211 to transmit, to the wireless communication apparatus 130, the WiGig Switching Request Frame F1 which makes a request to switch over the transmission system for performing wireless communication with the wireless communication apparatus 130 from the Wi-Fi system to the WiGig system (in step S2 of FIG. 5). Further, in response to reception of the WiGig Switching Response Frame F2, which is transmitted by the wireless communication apparatus 130 in response to the WiGig Switching Request Frame F1 and indicates acceptance of switching over the transmission system from the Wi-Fi system to the WiGig system, from the wireless transmitter and receiver unit 211 (in step S3 of FIG. 5), the transmission system judging unit 270 judges whether or not to switch over the transmission system from the Wi-Fi system to the WiGig system based at least on a received signal strength indicator measured when the wireless communication apparatus 120 received the WiGig Switching Response Frame F2 (in step S5 of FIG. 5).

In addition, the transmission system judging unit 270 judges to switch over the transmission system from the Wi-Fi system to the WiGig system, controls the wireless transmitter and receiver unit 211 to transmit, to the wireless communication apparatus 130, the acknowledgement (Ack) notifying that the wireless communication apparatus 120 is to switch over the transmission system from the Wi-Fi system to the WiGig system (in step S8 of FIG. 5), activates the wireless transmitter and receiver unit 212, and controls the wireless transmitter and receiver unit 212 to perform wireless communication with the wireless communication apparatus 130 (in step S9 of FIG. 5).

Further, the wireless communication apparatus 130 includes the wireless transmitter and receiver unit 311 configured to perform wireless communication in the Wi-Fi system, the wireless transmitter and receiver unit 312 configured to perform wireless communication in the WiGig system, and the transmission system judging unit 370 configured to control the wireless transmitter and receiver units 311 and 312. In this case, in response to reception of the WiGig Switching Request Frame F1, which makes a request to switch over the transmission system for performing wireless communication with the wireless communication apparatus 120 from the Wi-Fi system to the WiGig system, from the wireless communication apparatus 120 (in step S21 of FIG. 6A), the transmission system judging unit 370 judges whether or not to accept the switchover of the transmission system from the Wi-Fi system to the WiGig system based at least on the received signal strength indicator measured when the wireless communication apparatus 130 received the WiGig Switching Request Frame F1 (in step S24 of FIG. 6A), and controls the wireless transmitter and receiver unit 311 to transmit the WiGig Switching Response Frame F2 indicating the judgment result to the wireless communication apparatus 120 (in steps S23 and S27 of FIG. 6A and step S28 of FIG. 6B).

Furthermore, in response to reception of the acknowledgement (Ack), which is transmitted by the wireless communication apparatus 120 in response to the WiGig Switching Response Frame F2 and notifies that the wireless communication apparatus 120 is to switch over the transmission system from the Wi-Fi system to the WiGig system, from the wireless transmitter and receiver unit 311 (in step S29 of FIG. 6B), the transmission system judging unit 370 activates the wireless transmitter and receiver unit 312, and controls the wireless transmitter and receiver unit 312 to perform wireless communication with the wireless communication apparatus 120 (in step S30 of FIG. 6B).

As described above, in the wireless communication system 100 according to the first embodiment, the wireless communication apparatus 120 transmits, to the wireless communication apparatus 130, the WiGig Switching Request Frame F1 for making a request to switch over the transmission system for performing wireless communication with the wireless communication apparatus 130 from the Wi-Fi system to the WiGig system in the Wi-Fi system. On the other hand, the wireless communication apparatus 130 judges whether or not to accept the switchover of the transmission system for performing wireless communication with the wireless communication apparatus 120 to the WiGig system by using the RSSI measured when the wireless communication apparatus 130 received the WiGig Switching Request Frame F1. Further, the wireless communication apparatus 130 transmits the WiGig Switching Response Frame F2 that contains the judgment result, to the wireless communication apparatus 120 in the Wi-Fi system. In addition, the wireless communication apparatus 120 transmits the acknowledgement (Ack) to the wireless communication apparatus 130 and activates the wireless transmitter and receiver unit 212 for wireless communication in the WiGig system only on the condition that the wireless communication apparatus 120 has judged to switch over the transmission system for performing wireless communication with the wireless communication apparatus 130 to the WiGig system by judging YES in steps S4 to S7 of FIG. 5. Further, the wireless communication apparatus 130 activates the wireless transmitter and receiver unit 312 for wireless communication in the WiGig system only on the condition that the wireless communication apparatus 130 has judged to switch over the transmission system for performing wireless communication with the wireless communication apparatus 120 to the WiGig system (YES in step S29 of FIG. 6B) by receiving the acknowledgement (Ack) from the wireless communication apparatus 120. Therefore, the wireless transmitter and receiver units 212 and 312 are supplied with the power and activated only on the condition that it has been judged that the transmission system for performing wireless communication between the wireless communication apparatuses 120 and 130 is to be switched over to the WiGig system. Consequently, the wireless communication apparatus can reduce the power consumption as compared with the prior art.

In addition, for example, in the case where the wireless communication apparatus 120 can cause only one of the wireless transmitter and receiver unit 211 for wireless communication in the Wi-Fi system and the wireless transmitter and receiver unit 212 for wireless communication in the WiGig system to operate, the wireless communication apparatus 120 cannot activate the wireless transmitter and receiver unit 211 to perform communication in the Wi-Fi system when the wireless communication apparatus 120 has activated the wireless transmitter and receiver unit 212. However, in general, since the communication range of the antenna 212a for wireless communication in the WiGig system is narrower than the communication range of the antenna 211a for wireless communication in the Wi-Fi system, the wireless communication apparatus 120 cannot perform communication in the WiGig system in some cases when the wireless communication apparatus 120 activates the wireless transmitter and receiver unit 212. According to the first embodiment, the wireless communication apparatuses 120 and 130 judge whether or not to switch over the transmission system for performing wireless communication between the wireless communication apparatuses 120 and 130 to the WiGig system by using the RSSI measured when the wireless communication apparatus 130 received the WiGig Switching Request Frame F1 transmitted in the Wi-Fi system and the RSSI measured when the wireless communication apparatus 120 received the WiGig Switching Response Frame F2 transmitted in the Wi-Fi system. Therefore, the wireless communication apparatus 120 can judge whether or not to switch over the transmission system for performing wireless communication between the wireless communication apparatuses 120 and 130 to the WiGig system by performing wireless communication in the Wi-Fi system without activating the wireless transmitter and receiver unit 212.

Further, the Wi-Fi system has been widely used and various electronic appliances which support the Wi-Fi system have been provided recently. On the other hand, since the WiGig system can perform high data rate transmission as compared with the Wi-Fi system, it is desirable to use the WiGig system instead of the Wi-Fi system to transmit bulk data. According to the first embodiment, in the case where the wireless communication apparatus 120 is to switch over the transmission system for performing wireless communication with the wireless communication apparatus 130 to the WiGig system during transmitting and receiving data to and from the wireless communication apparatus 130 in the Wi-Fi system, the wireless communication apparatus 120 transmits the WiGig Switching Request Frame F1 to the wireless communication apparatus 130 in the Wi-Fi system ad-hoc mode. The wireless communication apparatus 130 can obtain the RSSI measured when the wireless communication apparatus 130 received the WiGig Switching Request Frame F1 and judge whether or not the wireless communication apparatus 130 can switch over the transmission system for performing wireless communication with the wireless communication apparatus 120 to the WiGig system by using the measurement result. In this case, the measured RSSI corresponds to the distance between the wireless communication apparatuses 120 and 130. In addition, since the WiGig Switching Request Frame F1 includes the Direction field F13 and the WiGig Support Channel field F14, and the wireless communication apparatus 130 performs the above described judgment by using the data set in the respective fields F13 and F14 as well as the RSSI measured when the wireless communication apparatus 130 received the WiGig Switching Request Frame F1. As a result, the wireless communication apparatus 130 can perform the judgment correctly as compared with the case where the wireless communication apparatus 130 uses only the RSSI measured when the wireless communication apparatus 130 received the WiGig Switching Request Frame F1.

Furthermore, the WiGig system is to be established as IEEE 802.1 lad which is a next generation wireless LAN standard. Therefore, a technology of seamlessly switching the transmission system between the Wi-Fi system and the WiGig system in the wireless communication apparatus that supports the Wi-Fi system and the WiGig system is required. The wireless communication system 100 according to the first embodiment can meet the requirement.

In addition, the wireless communication system 100 can select a more suitable wireless transmission system between the Wi-Fi system and the WiGig system based on the wireless communication state including the received signal strength indicator.

It is to be noted that, although the WiGig switching request process of FIG. 5 includes the judgment processes in steps S5, S6, and S7, the present disclosure is not limited to this. The WiGig switching request process of FIG. 5 may include at least the judgment process in step S5 among steps S5, S6, and S7. That is, the transmission system judging unit 270 may judge whether or not to switch over the transmission system for performing wireless communication with the wireless communication apparatus 130 from the Wi-Fi transmission system to the WiGig transmission system based at least on the RSSI measured when the wireless communication apparatus 120 received the WiGig Switching Response Frame F2.

In other words, the transmission system judging unit 270 may judge to switch over the transmission system from the Wi-Fi system to the WiGig system on the condition that the received signal strength indicator measured when the wireless communication apparatus 120 received the WiGig Switching Response Frame F2 is equal to or larger than the strength threshold Th120 for judging whether or not the wireless communication apparatus 120 can perform wireless communication in the WiGig system. Further, the transmission system judging unit 370 may accept the switchover of the transmission system from the Wi-Fi system to the WiGig system on the condition that the received signal strength indicator measured when the wireless communication apparatus 130 received the WiGig Switching Request Frame F1 is equal to or larger than the predetermined strength threshold Th130 for judging whether or not the wireless communication apparatus 130 can perform wireless communication in the WiGig system.

In addition, although the WiGig switching response process of FIG. 6A and FIG. 6B includes the judgment processes in steps S24, S25, and S26, the present disclosure is not limited to this. The WiGig switching response process of FIG. 6A and FIG. 6B may include at least the judgment process in step S24 among steps S24, S25, and S26. That is, the transmission system judging unit 370 may judge whether or not to switch over the transmission system for performing wireless communication with the wireless communication apparatus 120 from the Wi-Fi transmission system to the WiGig transmission system based at least on the RSSI measured when the wireless communication apparatus 130 received the WiGig Switching Request Frame F1.

Further, in the first embodiment, although the transmission system judging unit 270 judges whether or not to switch over the transmission system from the Wi-Fi system to the WiGig system in response to direct reception of the WiGig Switching Response Frame F2 from the wireless transmitter and receiver unit 211 (in step S3 of FIG. 5 and step S303 of FIG. 19), the present disclosure is not limited to this. The transmission system judging unit 270 may judge whether or not to switch over the transmission system from the Wi-Fi system to the WiGig system in response to reception of the WiGig Switching Response Frame F2 from the wireless transmitter and receiver unit 211 via the access point apparatus 110 (in step S3 of FIG. 5 and step S303 of FIG. 19).

First Modified Embodiment of the First Embodiment

In the first embodiment, in the case where the wireless communication apparatuses 120 and 130 are positioned as illustrated in FIG. 9, it is judged NO in step S5 of FIG. 5 and step S25 of FIG. 6A and the transmission system is not switched over from the Wi-Fi system to the WiGig system. However, the present disclosure is not limited to this and may prompt the user to change the orientation of the wireless communication apparatus 120 or the wireless communication apparatus 130 when it is judged NO in step S5 of FIG. 5 and step S25 of FIG. 6A.

Figure 22:
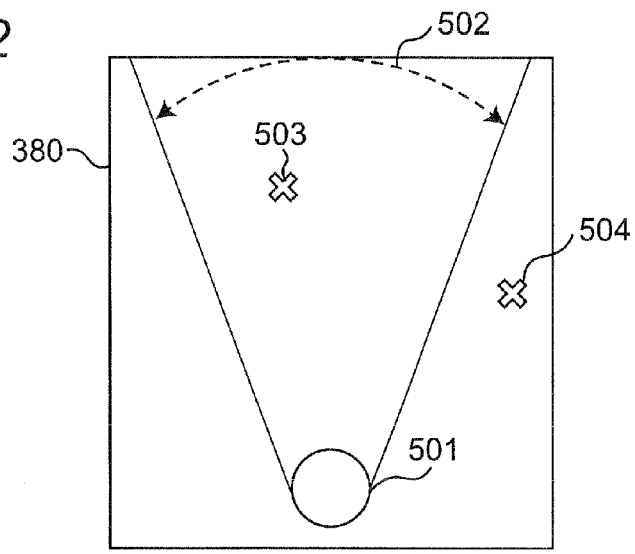
FIG. 22 is a plan view illustrating an exemplary display on an input and output unit 380 in step S25 of FIG. 6A showing the WiGig switching response process according to a first modified embodiment of the first embodiment of the present disclosure.

FIG. 22 is a plan view illustrating an exemplary display on the input and output unit 380 in step S25 (see FIG. 6A) showing the WiGig switching response process according to the first modified embodiment of the first embodiment of the present disclosure. In step S25 of FIG. 6A, the transmission system judging unit 370 causes the input and output unit 380 as a display apparatus to display a mark 501 which indicates the position of the wireless communication apparatus 130, a mark 502 which indicates the directions in which the wireless communication apparatus 130 can perform communication, and a mark 503 or 504 which indicates the position of the wireless communication apparatus 120. It is to be noted that the display of the mark 503 or 504 which indicates the position of the wireless communication apparatus 120 is based on the RSSI measured when the wireless communication apparatus 130 received the WiGig Switching Request Frame F1 and the direction of the wireless communication apparatus 130. In this case, the mark 503 corresponds to the position of the wireless communication apparatus 120 when it is judged YES in step S25 of FIG. 6A, whereas the mark 504 corresponds to the position of the wireless communication apparatus 120 when it is judged NO in step S25 of FIG. 6A. By displaying the mark 504, the wireless communication apparatus 130 can make a visual appeal to the user to adjust the orientation of the wireless communication apparatus 130 so that the wireless communication apparatus 130 can communicate with the wireless communication apparatus 120. In addition, by displaying the mark 503, the wireless communication apparatus 130 can make a visual appeal to the user to change the position of the wireless communication apparatus 130 so that the wireless communication apparatus 120 locates in the center of the range in which the wireless communication apparatus 130 can perform communication. Further, the transmission system judging unit 370 stands by until it is judged YES in step S25 of FIG. 6A.

Second Modified Embodiment of the First Embodiment

Figure 23:
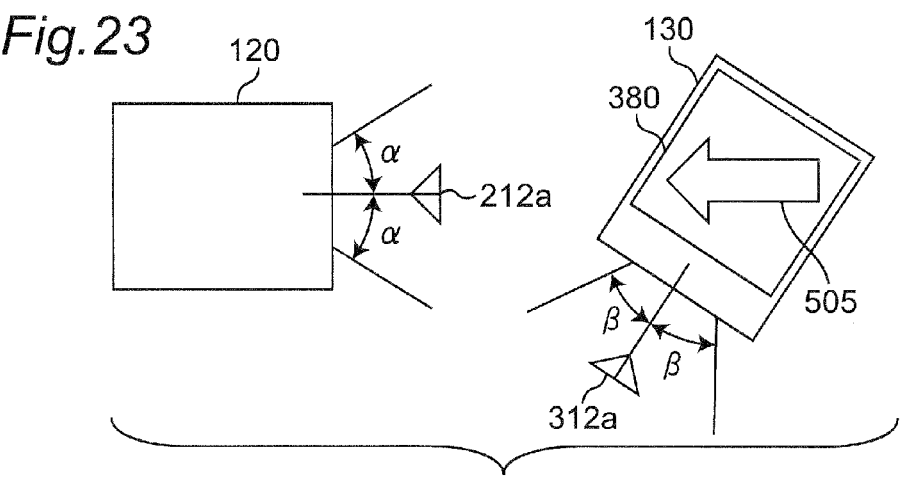
FIG. 23 is a plan view illustrating an exemplary display on the input and output unit 380 in the case where it is judged NO in step S25 of FIG. 6A in the WiGig switching response process according to a second modified embodiment of the first embodiment of the present disclosure.

An exemplary display on the input and output unit 380 is not limited to the exemplary display illustrated in FIG. 22. FIG. 23 is a plan view illustrating an exemplary display on the input and output unit 380 in the case where it is judged NO in step S25 of FIG. 6A in the WiGig switching response process according to the second modified embodiment of the first embodiment of the present disclosure. As illustrated in FIG. 23, the transmission system judging unit 370 displays, on the input and output unit 380, an arrow 505 indicating a direction to which the orientation of the wireless communication apparatus 130 is changed, when it is judged NO in step S25 of FIG. 6A. In that manner, the wireless communication apparatus 130 can make a visual appeal to the user to adjust the orientation of the wireless communication apparatus 130 so that the wireless communication apparatus 130 can communicate with the wireless communication apparatus 120.

Third Modified Embodiment of the First Embodiment

Figure 24:
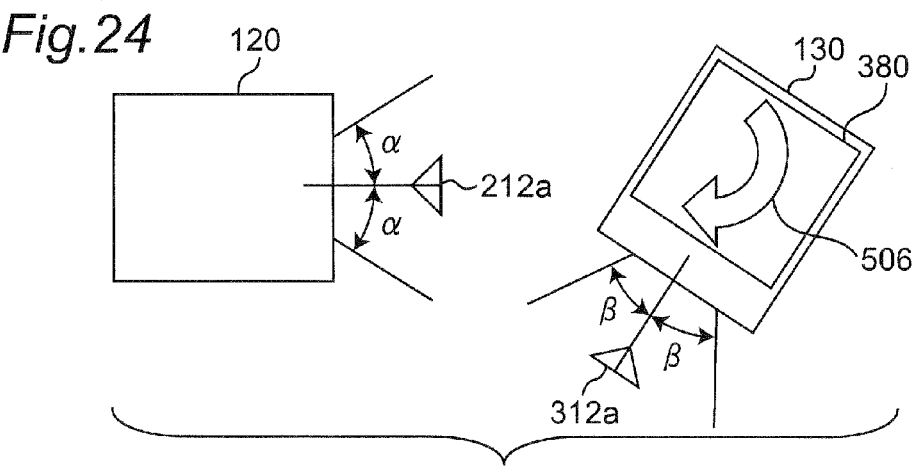
FIG. 24 is a plan view illustrating an exemplary display on the input and output unit 380 in the case where it is judged NO in step S25 of FIG. 6A in the WiGig switching response process according to a third modified embodiment of the first embodiment of the present disclosure.

FIG. 24 is a plan view illustrating an exemplary display on the input and output unit 380 in the case where it is judged NO in step S25 of FIG. 6A in the WiGig switching response process according to the third modified embodiment of the first embodiment of the present disclosure. As illustrated in FIG. 24, the transmission system judging unit 370 displays, on the input and output unit 380, an arrow 506 indicating a direction to which the orientation of the wireless communication apparatus 130 is turned, when No in step S25 of FIG. 6A. In that manner, the wireless communication apparatus 130 can make a visual appeal to the user to adjust the orientation of the wireless communication apparatus 130 so that the wireless communication apparatus 130 can communicate with the wireless communication apparatus 120.

Second Embodiment

Figure 25:
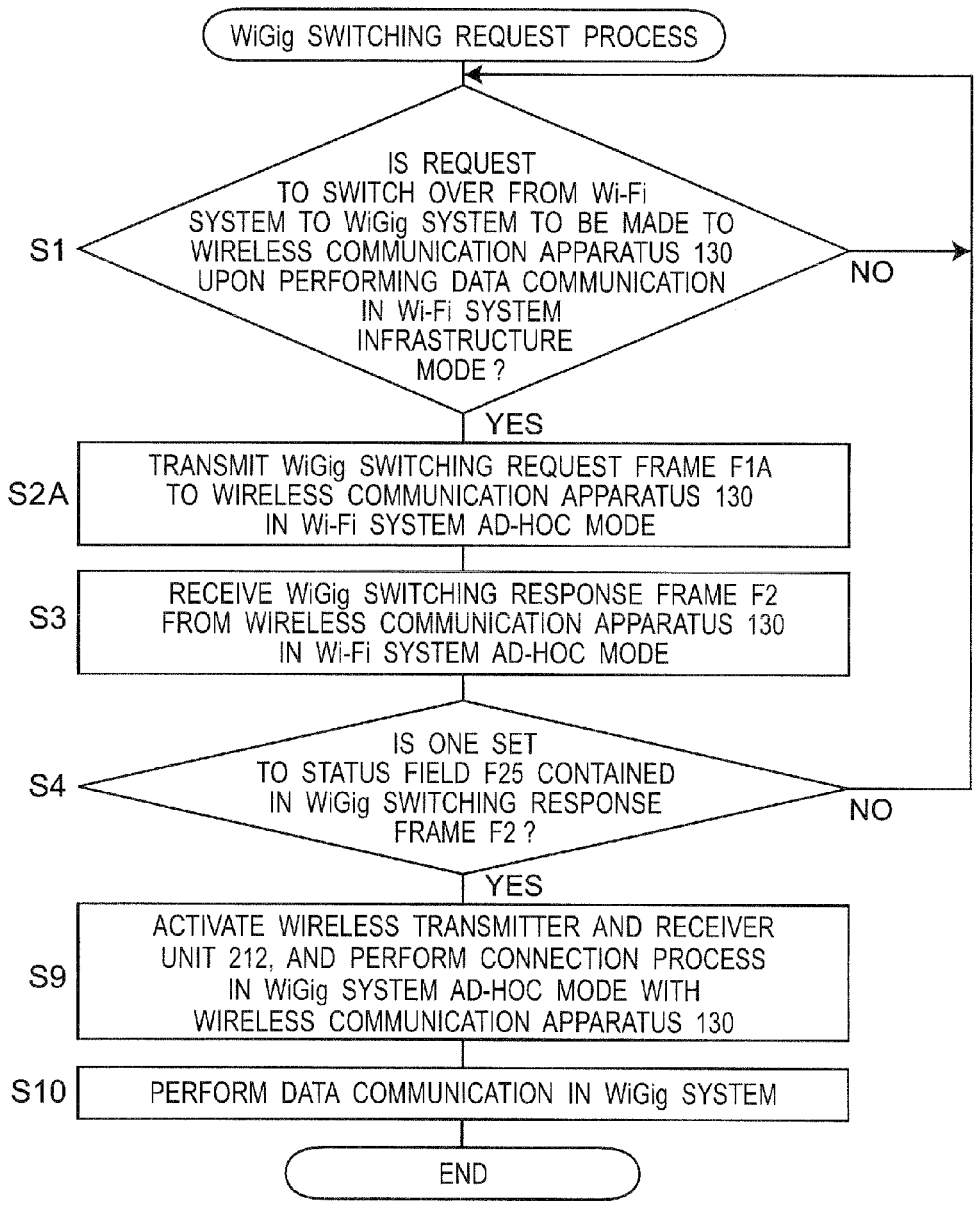
FIG. 25 is a flow chart showing a WiGig switching request process according to a second embodiment of the present disclosure performed by the transmission system judging unit 270 of FIG. 3 when the wireless communication apparatus 120 requests the wireless communication apparatus 130 to switch over the transmission system for performing wireless communication between the wireless communication apparatus 120 and the wireless communication apparatus 130 to a WiGig system in the wireless communication system 100 of FIG. 1.

FIG. 25 is a flow chart showing a WiGig switching request process according to the second embodiment of the present disclosure performed by a transmission system judging unit 270 of FIG. 3 when a wireless communication apparatus 120 requests a wireless communication apparatus 130 to switch the transmission system for performing wireless communication between the wireless communication apparatus 120 and the wireless communication apparatus 130 over to the WiGig system in a wireless communication system 100 of FIG. 1. The WiGig switching request process according to the second embodiment is different from the WiGig switching request process according to the first embodiment in that the wireless communication apparatus 120 transmits a WiGig Switching Request Frame F1A in place of the WiGig Switching Request Frame F1. In FIG. 25, processing similar to that in FIG. 5 is denoted by the same step number.

In step S1 of FIG. 25, when the wireless communication apparatus 120 performs data communication in the Wi-Fi system infrastructure mode, the transmission system judging unit 270 judges whether or not to request the wireless communication apparatus 130 to switch over the transmission system for performing wireless communication with the wireless communication apparatus 130 from the Wi-Fi system to the WiGig system. In step S1, in the case where the transmission system judging unit 270 has judged YES, the process proceeds to step S2A, whereas in the case where the transmission system judging unit 270 has judged NO, the process repeats the processing of step S1. In step S2A, the transmission system judging unit 270 transmits a WiGig Switching Request Frame F1A to the wireless communication apparatus 130 in the Wi-Fi system ad-hoc mode. In this case, as described in detail later, the WiGig Switching Request Frame F1A contains a strength threshold Th120 and a direction range α both of which stored in a transmission system judgment information storage unit 260, in addition to information about the direction of an antenna 212a acquired by a direction information acquisition unit 250 and info/illation about a channel used in the WiGig system supported by the wireless communication apparatus 120 (hereinafter, referred to as WiGig support channel). It is to be noted that the format of the WiGig Switching Request Frame F1A will be described in detail later.

Next, in step S3 subsequent to step S2A, the transmission system judging unit 270 receives a WiGig Switching Response Frame F2 from the wireless communication apparatus 130 in the Wi-Fi system ad-hoc mode. The WiGig Switching Response Frame F2 has the same format as that of the WiGig Switching Response Frame F2 according to the first embodiment (see FIG. 11). Next, in step S4, the transmission system judging unit 270 judges whether or not one is set to a Status field F25 contained in the WiGig Switching Response Frame F2, and in the case where the transmission system judging unit 270 has judged YES, the process proceeds to step S9, whereas in the case where the transmission system judging unit 270 has judged NO, the process returns to step S1. In step S9, the transmission system judging unit 270 supplies the power to a wireless transmitter and receiver unit 212 to activate the wireless transmitter and receiver unit 212 and performs a connection process such as a negotiation process with the wireless communication apparatus 130 in the WiGig system ad-hoc mode. Next, in step S10, data communication in the WiGig system is performed and the WiGig switching request process ends.

Figure 27:
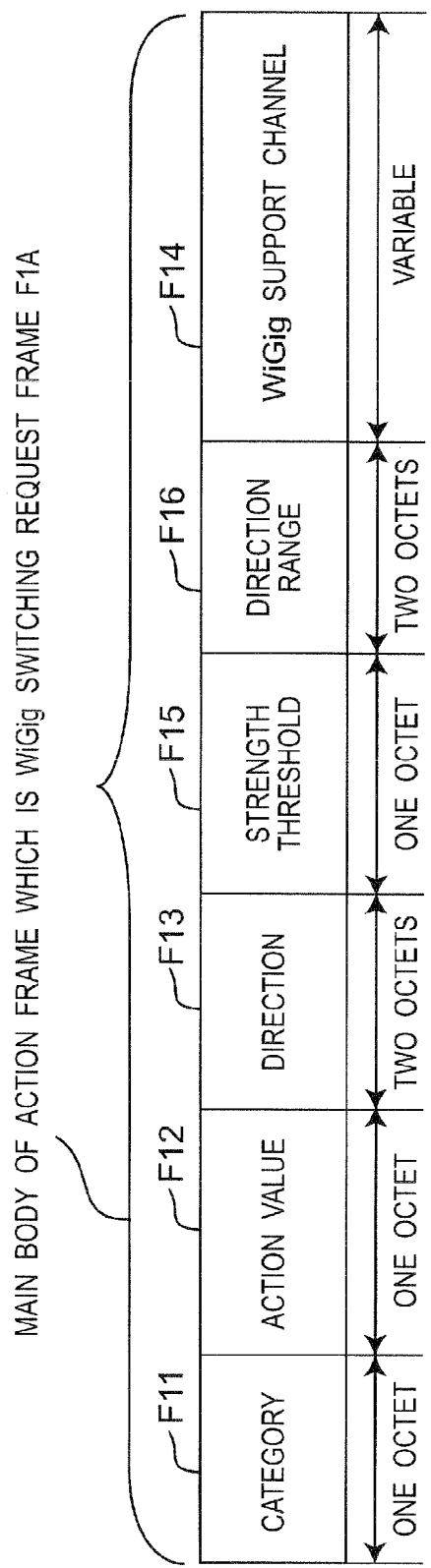
FIG. 27 is a format diagram showing a format of a WiGig Switching Request Frame F1A transmitted in step S2A of FIG. 25.

FIG. 27 is a format diagram showing a format of the WiGig Switching Request Frame F1A transmitted in step S2A of FIG. 25. Referring to FIG. 27, the WiGig Switching Request Frame F1A is different from the WiGig Switching Request Frame F1 of FIG. 10 in that the WiGig Switching Request Frame F1A further contains a Strength Threshold field F15 and a Direction Range field F16. Since the WiGig Switching Request Frame F1A and the WiGig Switching Request Frame F1 have the same configuration except for the above described points, only the different points will be described.

FIG. 28 is a table showing a strength threshold to be set to the Strength Threshold field F15 of FIG. 27. To the Strength Threshold field F15, the strength threshold Th120 stored in the transmission system judgment information storage unit 260 is set. As illustrated in FIG. 28, the strength threshold Th120 to be set to the Strength Threshold field F15 is a value ranging from −128 dBm to 127 dBm.

FIG. 29 is a table showing a direction range to be set to the Direction Range field F16 of FIG. 27. To the Direction Range field F16, the direction range α stored in the transmission system judgment information storage unit 260 is set. As illustrated in FIG. 29, the direction range α to be set to the Direction Range field F16 is a value ranging from 000 to 359.

FIG. 30 is a table showing values to be set to the respective fields F11, F12, F13, F14, F15, and F16 of the WiGig Switching Request Frame F1A transmitted in step S2A of FIG. 25. As shown in FIG. 30, the WiGig Switching Request Frame F1A contains the Strength Threshold field F15 and the Direction Range field F16.

Figure 26B:
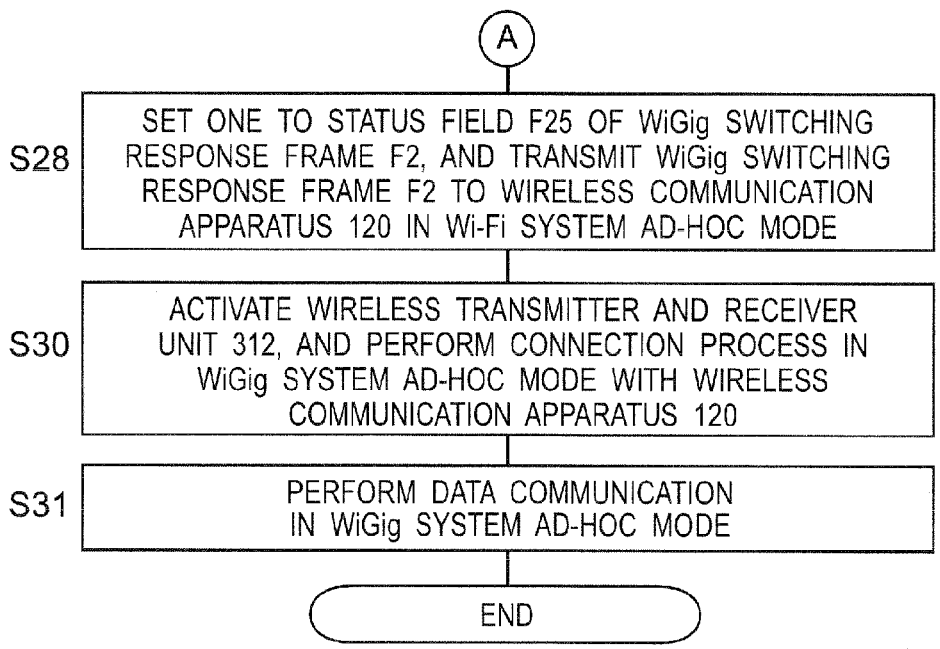
FIG. 26B is a flow chart showing a second part of the WiGig switching response process according to the second embodiment of the present disclosure performed by the transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to a WiGig system in the wireless communication system 100 of FIG. 1.

FIG. 26A and FIG. 26B are flow charts showing a WiGig switching response process according to the second embodiment of the present disclosure performed by the transmission system judging unit 370 of FIG. 4 when the wireless communication apparatus 120 requests the wireless communication apparatus 130 to switch over the transmission system for performing wireless communication between the wireless communication apparatus 120 and the wireless communication apparatus 130 to the WiGig system in the wireless communication system 100 of FIG. 1. It is to be noted that, in FIG. 26A and FIG. 26B, the WiGig switching response process which is similar to that in FIG. 6A and FIG. 6B is denoted by the same step numbers.

First of all, in step S21A of FIG. 26A, when the wireless communication apparatus 130 performs data communication in the Wi-Fi system infrastructure mode, the transmission system judging unit 370 judges whether the wireless communication apparatus 130 has received the WiGig Switching Request Frame F1A from the wireless communication apparatus 120 in the Wi-Fi system ad-hoc mode. Then, in step S21A, in the case where the transmission system judging unit 370 has judged YES, the process proceeds to step S22A, whereas in the case where the transmission system judging unit 370 has judged NO, the process repeats the processing of step S21A. In step S22A, the transmission system judging unit 370 judges whether or not the wireless communication apparatus 130 supports at least one of the WiGig support channels contained in the WiGig Switching Request Frame F1A, and in the case where the transmission system judging unit 370 has judged YES, the process proceeds to step S50, whereas in the case where the transmission system judging unit 370 has judged NO, the process proceeds to step S23. Further, in step S23, the transmission system judging unit 370 sets two to the Status field F25 of the WiGig Switching Response Frame F2 and transmits the WiGig Switching Response Frame F2 to the wireless communication apparatus 130 in the Wi-Fi system ad-hoc mode, and then the process returns to step S21A. In this case, on the condition that the wireless communication apparatuses 120 and 130 can perform communication in the WiGig system by a user's predetermined operation, the wireless communication apparatus 130 may use an input and output unit 380 or the like and prompt the user to correct the position or the direction of the wireless communication apparatus 120 or the wireless communication apparatus 130. Specifically, for example, in the case where the RSSI is smaller than a strength threshold Thmax which is to be described later, the wireless communication apparatus 130 may use the input and output unit 380 and prompt the user to move the wireless communication apparatus 130 nearer to the wireless communication apparatus 120. It is to be noted that processing in steps S21A, S22A, and S23 of FIG. 26A are the same as processing in steps S21, S22, and S23 of FIG. 6A, respectively. In addition, in the second embodiment, the WiGig Switching Response Frame F2 has the same format as that of the WiGig Switching Response Frame F2 of the first embodiment.

In step S50, the transmission system judging unit 370 sets the larger threshold among the strength threshold contained in the WiGig Switching Request Frame F1A and a strength threshold Th130 stored in a transmission system judgment information storage unit 360 to a strength threshold Thmax. Next, in step S51, the transmission system judging unit 370 judges whether the RSSI measured when the wireless communication apparatus 130 received the WiGig Switching Request Frame F1A is equal to or larger than the strength threshold Thmax, and in the case where the transmission system judging unit 370 has judged YES, the process proceeds to step S52, whereas in the case where the transmission system judging unit 370 has judged NO, the process proceeds to step S23.

In step S52, the transmission system judging unit 370 sets the narrower range among the direction range contained in the WiGig Switching Request Frame F1A and a direction range β stored in the transmission system judgment information storage unit 360 to a direction range γ. Then, in step S53, the transmission system judging unit 370 judges whether or not there is a possibility that the main beam of the antenna 212a overlaps the main beam of an antenna 312a, and in the case where the transmission system judging unit 370 has judged YES, the process proceeds to step S26, whereas in the case where the transmission system judging unit 370 has judged NO, the process proceeds to step S23. Specifically, the transmission system judging unit 370 judges whether or not there is a possibility that the main beam of the antenna 212a overlaps the main beam of the antenna 312a based on the direction of the antenna 212a contained in the WiGig Switching Request Frame F1A, the direction of the antenna 312a acquired by a direction information acquisition unit 350, and the direction range γ set in step S52. Then, in step S53, in the case where the transmission system judging unit 370 has judged YES, the process proceeds to step S26, whereas in the case where the transmission system judging unit 370 has judged NO, the process proceeds to step S23. It is to be noted that the processing in step S53 is the same as the processing in step S6 of FIG. 5.

In step S26, the transmission system judging unit 370 judges whether or not the user has agreed to switch over the transmission system for performing wireless communication between the wireless communication apparatuses 120 and 130 to the WiGig system. In the case where the transmission system judging unit 370 has judged YES, the process proceeds to step S28 of FIG. 26B, whereas in the case where the transmission system judging unit 370 has judged NO, the process proceeds to step S27. In step S27, the transmission system judging unit 370 sets zero to the Status field F25 of the WiGig Switching Response Frame F2 and transmits the WiGig Switching Response Frame F2 to the wireless communication apparatus 120 in the Wi-Fi system ad-hoc mode, and then the process returns to step S21A.

In step S28 of FIG. 26B, the transmission system judging unit 370 sets one to the Status field F25 of the WiGig Switching Response Frame F2 and transmits the WiGig Switching Response Frame F2 to the wireless communication apparatus 120 in the Wi-Fi system ad-hoc mode, and then the process proceeds to step S30. In step S30, the transmission system judging unit 370 activates a wireless transmitter and receiver unit 312 and performs a connection process such as a negotiation process with the wireless communication apparatus 120 in the WiGig system ad-hoc mode. Next, in step S31, data communication in the WiGig system is performed and the WiGig switching response process ends.

FIG. 31 is a timing chart showing an operation of the wireless communication system 100 when the wireless communication system 100 switches over the transmission system for performing wireless communication between the wireless communication apparatus 120 and the wireless communication apparatus 130 from the Wi-Fi system to the WiGig system in the second embodiment of the present disclosure. The timing chart of FIG. 31 is different from the timing chart of FIG. 19 in that the processing of step S302 is replaced by the processing of step S302A and the processing of step S304 is not performed. Since the timing chart of FIG. 31 and the timing chart of FIG. 19 are the same except for the above described point, only the different point will be described.

Referring to FIG. 31, in response to instructions to switch over the transmission system for performing wireless communication between the wireless communication apparatuses 120 and 130 to the WiGig system entered by the user into the wireless communication apparatus 120 from the input and output unit 280, in step S302A, the wireless communication apparatus 120 transmits the WiGig Switching Request Frame F1A to the wireless communication apparatus 130 in the Wi-Fi system ad-hoc mode. FIG. 32 is a table showing values to be set to the respective fields F11, F12, F13, F14, F15, and F16 of the WiGig Switching Request Frame F1A transmitted in step S302A of FIG. 31. As shown in FIG. 32, the WiGig Switching Request Frame F1A contains the Strength Threshold field F15 and the Direction Range field F16. In the example of FIG. 32, it is understood that −50 is set to the Strength Threshold field F15 and the strength threshold Th120 stored in the transmission system judgment information storage unit 260 of the wireless communication apparatus 120 is −50 dBm.

Referring to FIG. 31 again, in step S303, in response to the WiGig Switching Request Frame F1, the wireless communication apparatus 130 measures the RSSI at the time of receiving the WiGig Switching Request Frame F1A by using the received power measuring unit 320 and also extracts logical data from the WiGig Switching Request Frame F1A by using the communication frame processing unit 330 in step S303 of FIG. 19. Further, the wireless communication apparatus 130 judges whether or not to accept the switchover of the transmission system for performing wireless communication with the wireless communication apparatuses 120 to the WiGig system by performing the WiGig switching response process of FIG. 26A and FIG. 26B. Then, the wireless communication apparatus 130 sets data indicating the judgment result, i.e., one representing acceptance in FIG. 31, to the Status field F25 and transmits the WiGig Switching Response Frame F2 to the wireless communication apparatus 120.

As described above, the wireless communication apparatus 120 includes a wireless transmitter and receiver unit 211 configured to perform wireless communication in the Wi-Fi system, the wireless transmitter and receiver unit 212 configured to perform wireless communication in the WiGig system, and the transmission system judging unit 270 configured to control the wireless transmitter and receiver units 211 and 212. In this case, the transmission system judging unit 270 controls the wireless transmitter and receiver unit 211 to transmit, to the wireless communication apparatus 130, the WiGig Switching Request Frame F1A which makes a request to switch over the transmission system for performing wireless communication with the wireless communication apparatus 130 from the Wi-Fi system to the WiGig system (in step S2A of FIG. 25). In addition, in response to reception of the WiGig Switching Response Frame F2, which is transmitted by the wireless communication apparatus 130 in response to the WiGig Switching Request Frame F1A and indicates acceptance of the switchover of the transmission system from the Wi-Fi system to the WiGig system by the wireless transmitter and receiver unit 211 (in step S3 of FIG. 25), the transmission system judging unit 270 activates the wireless transmitter and receiver unit 212 and controls the wireless transmitter and receiver unit 212 to perform wireless communication with the wireless communication apparatus 130 (in step S9 of FIG. 25). Further, the WiGig Switching Request Frame F1A contains the predetermined strength threshold Th120 (FIG. 27) which is used by the transmission system judging unit 270 to judge whether or not the wireless communication apparatus 120 can perform wireless communication in the WiGig system based on a received signal strength indicator measured when the wireless communication apparatus 120 received the WiGig Switching Response Frame F2.

In addition, the wireless communication apparatus 130 includes a wireless transmitter and receiver unit 311 configured to perform wireless communication in the Wi-Fi system, the wireless transmitter and receiver unit 312 configured to perform wireless communication in the WiGig system, and the transmission system judging unit 370 configured to control the wireless transmitter and receiver units 311 and 312. In response to reception of the WiGig Switching Request Frame F1A, which makes a request to switch over the transmission system for performing wireless communication with the wireless communication apparatus 120 from the Wi-Fi system to the WiGig system, from the wireless communication apparatus 120 (in step S21A of FIG. 26A), the transmission system judging unit 370 judges whether or not to accept the switchover of the transmission system from the Wi-Fi system to the WiGig system based at least on a received signal strength indicator measured when the wireless communication apparatus 130 received the WiGig Switching Request Frame F1A, and controls the wireless transmitter and receiver unit 311 to transmit the WiGig Switching Response Frame F2 indicating the judgment result to the wireless communication apparatus 120 (in steps S23 and S27 of FIG. 26A and step S28 of FIG. 26B). In addition, when the transmission system judging unit 370 accepts the switchover of the transmission system from the Wi-Fi system to the WiGig system, the transmission system judging unit 370 activates the wireless transmitter and receiver unit 312 and controls the wireless transmitter and receiver unit 312 to perform wireless communication with the wireless communication apparatus 120 (in step S30 of FIG. 26B). In this case, the transmission system judging unit 370 judges whether or not to accept the switchover of the transmission system from the Wi-Fi system to the WiGig system by using the received signal strength indicator measured when the wireless communication apparatus 130 received the WiGig Switching Request Frame F1A, the strength threshold Th120 contained in the WiGig Switching Request Frame F1A, and the strength threshold Th130 which is used by the transmission system judging unit 370 for judging whether or not the wireless communication apparatus 130 can perform wireless communication in the WiGig system based on the received signal strength indicator measured when the wireless communication apparatus 130 received the WiGig Switching Request Frame F1A (in steps S50 and S51 of FIG. 26A).

In the first embodiment, the wireless communication apparatus 120 judges whether or not to switch over the transmission system for performing wireless communication between the wireless communication apparatus 120 and the wireless communication apparatus 130 from the Wi-Fi system to the WiGig system. However, in the second embodiment, the wireless communication apparatus 130 judges whether or not to switch over the transmission system from the Wi-Fi system to the WiGig system. Therefore, the wireless communication apparatus 120 does not have to transmit an acknowledgement (Ack) to the wireless communication apparatus 130. Further, the wireless communication apparatus 120 does not have to perform the judgment processes in steps S5 to S8. Therefore, according to the second embodiment, the wireless communication apparatus can reduce a time period for switching the transmission system as compared with the first embodiment. In addition, in the second embodiment, since the wireless communication apparatus 120 does not use the received signal strength indicator of the WiGig Switching Response Frame F2 transmitted from the wireless communication apparatus 130, the wireless communication apparatus 130 may transmit the WiGig Switching Response Frame F2 in the infrastructure mode.

It is to be noted that, in the second embodiment, the wireless communication apparatus 120 sets the strength threshold Th120 and the direction range α, both of which stored in the transmission system judgment information storage unit 260, to the WiGig Switching Request Frame F1A. However, the present disclosure is not limited to this. In the wireless communication apparatus 130, the WiGig Switching Request Frame F1A may contain information to be used in the judgment of whether or not to switch over the transmission system for performing wireless communication with the wireless communication apparatus 120 to the WiGig system.

In addition, the WiGig switching response process of FIG. 26A and FIG. 26B include the judgment processes in steps S51, S53, and S26. However, the present disclosure is not limited to this. The WiGig switching response process of FIG. 26A and FIG. 26B may include at least the judgment process in step S51 among steps S51, S53, and S26. That is, the transmission system judging unit 370 may judge whether or not to accept the switchover of the transmission system for performing wireless communication with the wireless communication apparatus 120 from the Wi-Fi transmission system to the WiGig transmission system based at least on the RSSI measured when the wireless communication apparatus 130 received the WiGig Switching Request Frame F1A and the strength thresholds Th120 and Th130.

In other words, the transmission system judging unit 370 may accept the switchover of the transmission system from the Wi-Fi system to the WiGig system, on the condition that the received signal strength indicator measured when the wireless communication apparatus 130 received the WiGig Switching Request Frame F1A is equal to or larger than the larger threshold Thmax among the strength thresholds Th120 and Th130.

Other Embodiments

As described above, the embodiments have been described as examples of the technology disclosed in the present application. However, the technology in the present disclosure is not limited to those embodiments and may also be applied to embodiments which have been subjected to modification, substitution, addition, or omission as required. In addition, the respective constituent elements described in the respective embodiments may be combined to form a new embodiment. Then, other embodiments will be described below as examples.

Although the wireless communication system 100 of FIG. 1, which includes the wireless communication apparatus 120, the wireless communication apparatus 130, and the access point apparatus 110, has been described in the respective embodiments, the present disclosure is not limited to this. The present disclosure can be applied to a wireless communication system including at least two wireless communication apparatuses which can communicate with each other by a plurality of transmission systems.

In addition, although the wireless communication apparatus 120 supports the two transmission systems of the Wi-Fi system and the WiGig system, and the wireless communication apparatus 130 supports the two transmission systems of the Wi-Fi system and the WiGig system in the above described respective embodiments, the present disclosure is not limited to this. Both of the wireless communication apparatus 120 and the wireless communication apparatus 130 may support two or more transmission systems different from the Wi-Fi system and the WiGig system. In this case, at least the frequency bands used by the plurality of transmission systems are different from each other.

Further, although the wireless communication apparatuses 120 and 130 perform wireless communication via the access point apparatus 110 in the Wi-Fi system infrastructure mode in the above described respective embodiments, the present disclosure is not limited to this. The wireless communication apparatuses 120 and 130 may perform wireless communication via a plurality of access point apparatuses 110 in the Wi-Fi system infrastructure mode.

Furthermore, although the received power measuring units 220 and 320 measure the RSSI of the input wireless signal in the above described respective embodiments, the present disclosure is not limited to this. The received power measuring units 220 and 320 may measure at least the value, i.e., the indicator that indicates the received power of the input wireless signal such as the RSSI or the Received Channel Power Indicator (RCPI). In this case, the received power is a strength of a received radio wave or a received signal.

In addition, in the above described respective embodiments, the transmission system judging unit 270 judges YES in step S1 of FIG. 5 or FIG. 25 on the condition that the user has instructed to switch over the transmission system for performing wireless communication between the wireless communication apparatus 120 and the wireless communication apparatus 130 from the Wi-Fi system to the WiGig system by using the input and output unit 280. In that manner, the wireless communication apparatus can respond exclusively to a user's demand for the switchover by switching over the transmission system to the WiGig system, and thus, the wireless communication apparatus can perform efficient switchover. However, the present disclosure is not limited to this. The transmission system judging unit 270 may judge YES in step S1 at a predetermined time period after the start of the data communication in the Wi-Fi system infrastructure mode. In this case, after having transmitted and received a predetermined amount of data in the Wi-Fi system infrastructure mode, the transmission system judging unit 270 can automatically switch the transmission system to the WiGig system which ensures faster and more efficient data transmission and reception. In addition, the transmission system judging unit 270 may transmit the WiGig Switching Request Frame F1 or F1A at every predetermined time period during the data communication in the Wi-Fi system infrastructure mode. In that manner, the transmission system judging unit 270 can automatically switch over the transmission system for performing wireless communication between the wireless communication apparatus 120 and the wireless communication apparatus 130 from the Wi-Fi system to the WiGig system.

Further, although the transmission system judging unit 370 judges whether or not the wireless communication apparatus 130 supports at least one of the WiGig support channels contained in the WiGig Switching Request Frame F1 or the WiGig Switching Request Frame F1A (in step S22 of FIG. 6A and step S22A of FIG. 26A) in the above described respective embodiments, the present disclosure is not limited to this. The transmission system judging unit 370 may set information about whether the wireless communication apparatuses 120 and 130 can communicate with each other in the WiGig system other than the WiGig support channels to the WiGig Switching Request Frame F1 or F1A and may perform the judgment process similar to those in step S22 of FIG. 6A and step S22A of FIG. 26A based on the information set to the Frame F1 or F1A.

Furthermore, although the wireless communication apparatuses 120 and 130 are described in the above described respective embodiments, the present disclosure is not limited to them. A method including each step of the WiGig switching request process of FIG. 5 or FIG. 25 may be implemented as a control method for the wireless communication apparatus 120. In addition, a method including each step of the WiGig switching response process of FIG. 6A and FIG. 6B or FIG. 26A and FIG. 26B may be implemented as a control method for the wireless communication apparatus 130. Further, the WiGig switching request process of FIG. 5 or FIG. 25 may be implemented as a program including each step of the process, a computer-readable recording medium that stores the program, or an integrated circuit constituted of a logical circuit of a hardware device such as a Programmable Logic Device (PLD). The WiGig switching response process of FIG. 6A and FIG. 6B or FIG. 26A and FIG. 26B may be implemented as a program including each step of the process, a computer-readable recording medium that stores the program, or an integrated circuit constituted of a logical circuit of a hardware device such as a PLD. In this case, the above described program may be executed by an arithmetic apparatus such as a Central Processing Unit (CPU) or a Digital Signal Processor (DSP), for example.

The embodiments have been described above as examples of the technology of the present disclosure. For describing those embodiments, the accompanying drawings and the detailed description have been provided.

Consequently, in order to exemplify the above described technology, the constituent elements shown in the accompanying drawings and described in the detailed description may include not only a constituent element which is necessary to solve the problem but also a constituent element which is unnecessary to solve the problem. Therefore, the unnecessary constituent element should not be instantly recognized as a necessary constituent element merely because it is illustrated in the accompanying drawings and described in the detailed description.

In addition, since the above described embodiments are for exemplifying the technology of the present disclosure, the embodiments may be subjected to various modifications, substitutions, additions, omission, or the like without departing from the scope of the claims and their equivalents.

What is claimed is:

1. A first wireless communication apparatus for use in a wireless communication system, the wireless communication system comprising the first wireless communication apparatus and a second wireless communication apparatus, the first wireless communication apparatus comprising:
    a first wireless transmitter and receiver unit that performs wireless communication by a predetermined first transmission system;
    a second wireless transmitter and receiver unit that performs wireless communication by a predetermined second transmission system; and
    a first transmission system judging unit that controls the first wireless transmitter and receiver unit and the second wireless transmitter and receiver unit,
    wherein the first transmission system judging unit controls the first wireless transmitter and receiver unit to transmit a switching request frame including parameters on the second transmission system to the second wireless communication apparatus, the switching request frame indicating a request to switch over a transmission system for performing wireless communication between the first wireless communication apparatus and the second wireless communication apparatus from the first transmission system to the second transmission system,
    wherein, the first wireless transmitter and receiver unit receives a switching response frame transmitted by the second wireless communication apparatus, the switching response frame indicating allowing to switch over the transmission system from the first transmission system to the second transmission system,
    wherein the first transmission system judging unit judges whether or not to switch over the transmission system from the first transmission system to the second transmission system based on a received signal strength measured when the first wireless transmitter and receiver unit received the switching response frame, and
    wherein, when the first transmission system judging unit judges that the transmission system is switched over from the first transmission system to the second transmission system, the first transmission system judging unit activates the second wireless transmitter and receiver unit, and data communication in the wireless communication system is performed using the second transmission system.

2. The first wireless communication apparatus as claimed in claim 1,
    wherein the first transmission system judging unit controls the first wireless transmitter and receiver unit to directly transmit the switching request frame to the second wireless communication apparatus by specifying an address that identifies the second wireless communication apparatus when the first wireless communication apparatus is indirectly communicating with the second wireless communication apparatus via a relay apparatus in the first transmission system, the switching request frame indicating a request to switch the transmission system for performing wireless communication between the first wireless communication apparatus and the second wireless communication apparatus over from the first transmission system to the second transmission system.

3. The first wireless communication apparatus as claimed in claim 1,
    wherein the first transmission system judging unit judges that the first wireless communication apparatus is to switch over the transmission system from the first transmission system to the second transmission system, activates the second wireless transmitter and receiver unit after control of the first wireless transmitter and receiver unit to transmit, to the second wireless communication apparatus, an acknowledgement notifying that the first wireless communication apparatus is to switch over the transmission system from the first transmission system to the second transmission system, and controls the second wireless transmitter and receiver unit to perform wireless communication with the second wireless communication apparatus.

4. The first wireless communication apparatus as claimed in claim 1,
    wherein the first transmission system judging unit judges that the first wireless communication apparatus is to switch over the transmission system from the first transmission system to the second transmission system when the received signal strength measured when the first wireless transmitter and receiver unit received the switching response frame is equal to or larger than a predetermined first strength threshold for judging whether or not the first wireless communication apparatus is able to perform wireless communication in the second transmission system.

5. The first wireless communication apparatus as claimed in claim 1,
    wherein a frequency band used in the first transmission system and a frequency band used in the second transmission system are different from each other.

6. The first wireless communication apparatus as claimed in claim 1,
    wherein the parameters on the second transmission system included in the switching request frame includes information of a transmittable channel for use in the second transmission system.

7. The first wireless communication apparatus as claimed in claim 1,
    wherein the second transmission system is a wireless transmission system having a directionality, and
    wherein the first wireless communication apparatus further comprises a first direction information acquisition unit that acquires information of direction of an antenna for use in a wireless communication of the second transmission system.

8. A second wireless communication apparatus for use in a wireless communication system, the wireless communication system comprising a first wireless communication apparatus and the second wireless communication apparatus, the second wireless communication apparatus comprising:
  a third wireless transmitter and receiver unit that performs wireless communication by a predetermined first transmission system;
  a fourth wireless transmitter and receiver unit that performs wireless communication by a predetermined second transmission system; and
  a second transmission system judging unit that controls the third wireless transmitter and receiver unit and the fourth wireless transmitter and receiver unit,
  wherein, the third wireless transmitter and receiver unit receives a switching request frame transmitted by the first wireless communication apparatus, the switching request frame indicating requesting to switch over a transmission system for performing wireless communication between the first wireless communication apparatus and the second wireless communication apparatus from the first transmission system to the second transmission system,
  wherein the second transmission system judging unit judges whether or not to switch over the transmission system from the first transmission system to the second transmission system based on a received signal strength measured when the third wireless transmitter and receiver unit received the switching request frame,
  wherein, when the second transmission system judging unit judges that the transmission system is switched over from the first transmission system to the second transmission system, the third wireless transmitter and receiver unit transmits a switching response frame to the first wireless communication apparatus, and
  wherein, when the third wireless transmitter and receiver unit receives such a judgment result that the transmission system is switched over from the first transmission system to the second transmission system, the third wireless transmitter and receiver unit activates the fourth transmitter and receiver unit, and data communication in the wireless communication system is performed using the second transmission system.

9. The second wireless communication apparatus as claimed in claim 8,
  wherein, in response to reception of an acknowledgement by the third wireless transmitter and receiver unit, the second transmission system judging unit activates the fourth wireless transmitter and receiver unit and controls the fourth wireless transmitter and receiver unit to perform wireless communication with the first wireless communication apparatus, the acknowledgement being transmitted by the first wireless communication apparatus in response to the switching response frame and notifying that the first wireless communication apparatus is to switch over the transmission system from the first transmission system to the second transmission system.

10. The second wireless communication apparatus as claimed in claim 8,
  wherein the second transmission system judging unit allows to switch over the transmission system from the first transmission system to the second transmission system when the received signal strength measured when the second wireless communication apparatus received the switching request frame is equal to or larger than a predetermined second strength threshold for judging whether or not the second wireless communication apparatus is able to perform wireless communication by the second transmission system.

11. The second wireless communication apparatus as claimed in claim 8,
  wherein the second transmission system is a wireless transmission system having a directionality,
  wherein the second wireless communication apparatus further comprises:
  a display unit that displays a direction communicable with the first wireless communication apparatus by using the second transmission system; and
  a second direction information acquisition unit that acquires information of direction of an antenna for use in a wireless communication of the second transmission system, and
  wherein, when the second transmission system judging unit judges that a received signal strength when the first transmitter and receiver unit receives the switching request frame is equal to or larger than a threshold value, and that a main beam of an antenna used by the fourth wireless transmitter and receiver unit is not overlapped on a main beam of an antenna used by the second wireless transmitter and receiver unit, the display unit displays a direction communicable with the first wireless communication apparatus by using the second transmission system, based on the received signal strength when the third wireless transmitter and receiver unit receives the switching request frame, and the direction acquired by the second direction information acquisition unit.

12. A wireless communication system comprising a first wireless communication apparatus, and a second wireless communication apparatus,
  wherein the first wireless communication apparatus comprises:
  a first wireless transmitter and receiver unit that performs wireless communication by a predetermined first transmission system;
  a second wireless transmitter and receiver unit that performs wireless communication by a predetermined second transmission system; and
  a first transmission system judging unit that controls the first wireless transmitter and receiver unit and the second wireless transmitter and receiver unit,
  wherein the first transmission system judging unit controls the first wireless transmitter and receiver unit to transmit a switching request frame including parameters on the second transmission system to the second wireless communication apparatus, the switching request frame indicating a request to switch over a transmission system for performing wireless communication between the first wireless communication apparatus and the second wireless communication apparatus from the first transmission system to the second transmission system,
  wherein, the first wireless transmitter and receiver unit receives a switching response frame transmitted by the second wireless communication apparatus, the switching response frame indicating allowing to switch over the transmission system from the first transmission system to the second transmission system,
  wherein the first transmission system judging unit judges whether or not to switch over the transmission system from the first transmission system to the second transmission system based at least on a received signal strength measured when the first wireless transmitter and receiver unit received the switching response frame, and wherein, when the first transmission system judging unit judges that the transmission system is switched over from the first transmission system to the second transmission system, the first transmission system judging unit activates the second wireless transmitter and receiver unit, wherein the second wireless communication apparatus comprises:

a third wireless transmitter and receiver unit that performs wireless communication by a predetermined first transmission system;

a fourth wireless transmitter and receiver unit that performs wireless communication by a predetermined second transmission system; and a second transmission system judging unit that controls the third wireless transmitter and receiver unit and the fourth wireless transmitter and receiver unit, wherein, the third wireless transmitter and receiver unit receives a switching request frame transmitted by the first wireless communication apparatus, the switching request frame indicating requesting to switch over the transmission system for performing wireless communication between the first wireless communication apparatus and the second wireless communication apparatus from the first transmission system to the second transmission system, wherein the second transmission system judging unit judges whether or not to switch over the transmission system from the first transmission system to the second transmission system based on a received signal strength measured when the third wireless transmitter and receiver unit received the switching request frame, wherein, when the second transmission system judging unit judges that the transmission system is switched over from the first transmission system to the second transmission system, the third wireless transmitter and receiver unit transmits a switching response frame to the first wireless communication apparatus, and wherein, when the third wireless transmitter and receiver unit receives such a judgment result that the transmission system is switched over from the first transmission system to the second transmission system, the third wireless transmitter and receiver unit activates the fourth transmitter and receiver unit, and data communication in the wireless communication system is performed using the second transmission system.

13. A control method for use in a wireless communication system, the wireless communication system comprising a first wireless communication apparatus and a second wireless communication apparatus, wherein the first wireless communication apparatus comprises: a first wireless transmitter and receiver unit that performs wireless communication by a predetermined first transmission system; a second wireless transmitter and receiver unit that performs wireless communication by a predetermined second transmission system; and a first transmission system judging unit that controls the first wireless transmitter and receiver unit and the second wireless transmitter and receiver unit, and the second wireless communication apparatus comprises: a third wireless transmitter and receiver unit that performs wireless communication by the predetermined first transmission system; a fourth wireless transmitter and receiver unit that performs wireless communication by the predetermined second transmission system; and a second transmission system judging unit that controls the third wireless transmitter and receiver unit and the fourth wireless transmitter and receiver unit, the control method comprising the steps of:

controlling, by the first transmission system judging unit, the first wireless transmitter and receiver unit to transmit a switching request frame including parameters on the second transmission system to the second wireless communication apparatus, the switching request frame indicating a request to switch over a transmission system for performing wireless communication between the first wireless communication apparatus and the second wireless communication apparatus from the first transmission system to the second transmission system;

receiving, by the third wireless transmitter and receiver unit, a switching request frame transmitted by the first wireless communication apparatus, the switching request frame indicating requesting to switch over the transmission system for performing wireless communication between the first wireless communication apparatus and the second wireless communication apparatus from the first transmission system to the second transmission system, judging, by the second transmission system judging unit, whether or not to switch over the transmission system from the first transmission system to the second transmission system based on a received signal strength measured when the third wireless transmitter and receiver unit received the switching request frame;

when the second transmission system judging unit judges that the transmission system is switched over from the first transmission system to the second transmission system, transmitting, by the third wireless transmitter and receiver unit, a switching response frame to the first wireless communication apparatus;

receiving, by the first wireless transmitter and receiver unit, a switching response frame transmitted by the second wireless communication apparatus, the switching response frame indicating allowing to switch over the transmission system from the first transmission system to the second transmission system, judging, by the first transmission system judging unit, whether or not to switch over the transmission system from the first transmission system to the second transmission system based on a received signal strength measured when the first wireless transmitter and receiver unit received the switching response frame;

when the first transmission system judging unit judges that the transmission system is switched over from the first transmission system to the second transmission system, activating, by the first transmission system judging unit, the second wireless transmitter and receiver unit; and when the third wireless transmitter and receiver unit receives such a judgment result that the transmission system is switched over from the first transmission system to the second transmission system, activating, by the third wireless transmitter and receiver unit, the fourth transmitter and receiver unit, and performing, using the second transmission system, data communication in the wireless communication system.

* * * * *